United States Patent [19]

Peabody et al.

[11] 3,882,502
[45] May 6, 1975

[54] CRT MULTIPLE-SCAN DISPLAY APPARATUS AND METHOD PROVIDING TARGET DISCRIMINATION

[75] Inventors: Roger H. Peabody, Kings Park, L. I.; Seymour Sutkin, Huntington Station, L. I.; Charles Chubb, Brookville, all of N.Y.

[73] Assignee: United States of America as represented by the Secretary of the Navy, Washington, D.C.

[22] Filed: Jan. 17, 1974

[21] Appl. No.: 434,168

[52] U.S. Cl. .................. 343/17; 343/5 DP; 343/7.7
[51] Int. Cl. ............................................. G01s 7/06
[58] Field of Search ..................... 343/5 DP, 7.7, 17

[56] References Cited
UNITED STATES PATENTS

| | | | |
|---|---|---|---|
| 3,281,839 | 10/1966 | Triest et al. ........................ | 343/5 DP |
| 3,474,445 | 10/1969 | Redman................................ | 343/7.7 |
| 3,571,479 | 3/1971 | Horattas ......................... | 343/5 DPX |
| 3,789,403 | 1/1974 | Dalena.............................. | 343/5 DP |
| 3,824,593 | 7/1974 | Baird ..................... | 343/17 |

*Primary Examiner*—Malcolm F. Hubler
*Attorney, Agent, or Firm*—R. S. Sciascia; P. Schneider; E. La Roche

[57] ABSTRACT

A CRT multiple-scan display apparatus and method providing radar-moving-target discrimination by displaying targets from a finite number of antenna scans within the time interval of one real-time antenna scan. Target azimuth, range, elevation, and antenna scan number data for a finite number of scans is stored in a memory. A digital X-Y function generator allows direct reading of X-Y coordinate data into memory eliminating the requirement of a memory input buffer. During the time interval target data is not read into memory, the stored target data is systematically extracted from memory and subjected to erasure and display tests. The time-ordering of memory is retained by utilizing a memory-search address counter for the erasure and display tests and a new-target write counter for the memory location for new target data being written into memory. The targets for each stored scan are repetitively displayed in rapid succession; thus, a moving target is displayed on a CRT as a series of flashing dots on a line of residual light whereas a stationary target remains a single dot on a CRT and noise displays as random flashing dots. Old data is erased from memory. Means for indicating elevation of displayed targets or for displaying targets only for specific predetermined elevations are provided. Also, memory overload-detector means are utilized.

7 Claims, 20 Drawing Figures

CRT MULTIPLE-SCAN DISPLAY APPARATUS AND METHOD PROVIDING TARGET DISCRIMINATION

BACKGROUND OF THE INVENTION

1. Field of the Invention

The present invention relates generally to target discrimination systems and more particularly to systems that discriminate between moving-target signals, stationary-target signals, and random-noise signals on a display device.

2. Description of the Prior Art

Moving target indication radar display systems have been devised utilizing a series of light sensitive layers of different time responses as filtering properties emitting different colors, superimposed over a light emitting layer e.g. a phosphor layer in a CRT or a matrix of light emitting diodes. The target display color indicates the speed of the target. Similar systems utilize a plurality of cooperating phosphor layers having different persistences and different luminescent emissions. Stationary targets excite a greater number of phosphor layers than moving targets, thus the hue of the displayed target is a function of its speed. Such systems require continual interpretative differentiation on the part of the viewing operator. This not only introduces a factor of time delay, but also becomes a fatigue inducing aggravation with resultant variations in discernment. In addition, evaluation of luminescent intensities and color differences by different individuals assumes significance as a human variant. Targets exhibiting varying speeds may be lost. Incremental speed variations may not be discernible i.e. the speed spectrum is quantized with the number of layers and the discernment capability of the viewing operator being the limiting factors. Also, since such systems utilize real time display the antenna scan rate must be compatible with the persistences of the light emitting layers or targets will be lost. Finally, the "memory capacity" of such systems is limited by the persistences of the light sensitive layers associated with the specific device.

Radar display systems have been devised utilizing a memory with associated control circuit means. Such systems store digitized radar target data in a memory which is synchronized with the radar and which maps the entire surveillance area of the radar into small quantum areas, typically a few square miles in area. Each quantum area is represented in the memory so that the memory stores the presence or absence of a target in each quantum area i.e. target data and non-target data. Such systems may store a finite number of scans or only one scan in memory prior to display. Such structuring of memory does not optimize storage of target data. More hardware is necessary to store target and non-target data than would be necessary if only target data were stored. Also, memory scan time is increased i.e. the memory address locations of the non-target data must be scanned in addition to the target data memory address locations. Memory scan time is significant because the luminescent persistence of a CRT is of some finite time. If the memory scan time is greater than the persistence then the displayed targets will flicker and may be lost. Thus, by increasing the memory scan time, prior art radar displays reduce the size of the surveillance area and/or reduce the number of target returns processable. Another ramification of this less than optimal storage technique is, that slower moving targets become lost i.e. they become stationary targets. For a given surveillance area and memory size, the size of a quantum area has a lower limit which is a function of the memory scanning time and the persistence of the CRT. As the size of a quantum area is reduced the target may traverse it in less time. For example, if a radar display system stores three antenna scans, a slow moving target that traverses but one quantum area in the time period of three antenna scans will appear as a stationary target. If that quantum area could be reduced in size by one-half or less the slow moving target would then appear as a moving target.

Prior art radar display systems utilizing a memory, store target data in either polar coordinate form of X-Y coordinate form. Those systems in which the memory is structured so as to store target and non-target data on all quantum areas of the entire surveillance area, merely require time synchronization of the memory locations with the incoming target or non-target data. However, in systems which store only target data each target memory location must contain information indicating the target's position in the surveillance area. If target position information is stored in polar coordinate form and the display device is compatible with polar coordinate representation, such as a PPI radar display, a range delay means must be employed to unblank the electron beam at the proper time so the target position as displayed, will correspond to the target position in the surveillance area. If the display device is compatible with X-Y coordinate data the electron beam need only be directed to those areas of the screen where targets are to be displayed. Hence a display device compatible with X-Y coordinate data can display all the targets in the surveillance area in a shorter time period than a display device compatible with polar coordinate data. The advantages gained are the same as discussed, supra, with respect to reduced memory scan time since a reduction in display time is equivalent to a reduction in memory scan time. Prior art systems storing target position data in memory in X-Y coordinates calculate the X-Y coordinates of each target by multiplying the target's range by the sine and cosine of the bearing after target detection. Typically, range is measured by sampling at target detection time a range counter that accumulated range clock pulses. The multiplication is performed in a time-shared multiplier and the output data stored in a memory input buffer prior to entrance into the main memory. An input buffer is a necessity because the range resolution requirement is less than the propagation delay time of the multiplier i.e. of two targets are contiguous on the same azimuth in the surveillance area the multiplier cannot process the first received radar pulse before the second pulse is ready for processing. Other systems utilize delay lines in conjunction with additional memory arrays to prevent loss of target data. Thus, due to propagation delays prior art systems whose display devices are compatible with X-Y coordinate data have a limited range resolution capability.

Moving target indication radar display systems have been devised utilizing storage tubes that function as memory devices. Storage tubes are costly. They are bulky and take up relatively a large amount of space. They are heavy and subject to breakage. Also, they require high voltages for operation which necessitates special power generating devices. Also, such systems utilizing storage tubes store target data in polar coordinate i.e. in standard PPI radar form. The disadvantages of structuring memory in such a manner were discussed, supra, with respect to the advantages gained by storing target data in X-Y coordinates form.

Moving target indication radar systems have been devised utilizing digital memorys for storage of data from a finite number of antenna scans. Such systems store digitized radar target data in a memory which is synchronized with the radar and which maps the entire surveillance area of the radar into small quantum areas. Each quantum area of the surveillance area has a designated location in memory which indicates the presence or absence of a target within that quantum area. The disadvantages of structuring the memory to represent quantum areas of the surveillance area were set forth, supra. Some such systems read out target data from a specific quantum area for a finite number of scans. A digital device based on a predetermined criteria selects those targets which are stationary i.e. a target which recurs repeatedly in a quantum area is stationary. The digital device, if a stationary target is detected, then signals a control device to inhibit the display of the incoming target data from the antenna for that particular quantum area. Thus target data is displayed in real time. Therefore, the antenna scan rate must be compatible with the luminescent persistence of the display device, e.g. a CRT, or flicker or loss of displayed targets will result. Since data from a finite number of antenna scans is stored, but only data from one antenna scan, the current antenna scan, is displayed, there is no pictorial indication of target direction and speed. Also, random noise may result in displaying an erroneous moving target. In addition, stationary targets are entirely inhibited from display.

SUMMARY OF THE INVENTION

The primary function of the present invention is to display a past history of target position, along with the present position, in such a manner as to highlight the presence of moving targets amid stationary targets and random noise. This function is accomplished by the repetitive display of data from a finite number of past antenna scans in rapid succession so that a target that has changed position from scan to scan is displayed as a series of flashing dots on a line of residual light retained by a CRT phosphor, thus indicating its direction and speed. Stationary targets are displayed without this "vector effect" and random noise is displayed as random flashing dots that are easily distinguished. Target azimuth, range, elevation, and antenna scan number data for a finite number of antenna scans is stored in a ferrite-core memory. By storing only target data, as opposed to storing both target and non-target data, the amount of hardware is reduced. Also, memory scan time is reduced, since scan time is not consumed searching address locations containing non-target data. This reduction in scan time permits the present invention to increase the size of the surveillance area and/or increase the number of target returns processed without loss of displayed targets as in prior art systems. In addition, moving targets may be detected at slower speeds than in prior art systems since the capability of storing a greater number of targets from a given surveillance area size is tantamount to a reduction in quantum area size. In contradistinction to systems utilizing storage-tube memories, the ferrite-core memory utilized by the present invention provides light-weight, compact, low-cost, low-voltage data-storage means. Digital X and Y function generators allow direct reading of the X-Y coordinate data into memory eliminating the necessity of a memory input buffer or additional delay lines and memory arrays, thus effecting finer range resolution while reducing the amount of hardware required. The X and Y coordinates of the target are provided prior to detection and are simply written into memory at target detection time. During the time interval in which target data is not read into memory, the stored target data is systematically extracted from memory and subjected to erasure and display tests. The display rate is much faster than the rate at which the radar injects data via its antenna scan rate. Thus, the antenna scan rate is independent of the luminescent persistence of the display device. In addition, moving targets are not distinguished on the basis of luminescent intensities or color differences, hence a much finer quantization of the speed spectrum is attainable than in systems utilizing light-sensitive layers as storage devices. The time ordering of memory is retained by utilizing a memory-search address counter for the erasure and display tests and a new target write counter for the memory location for new target data being written into memory. Old target data is erased from memory. Also, means for indicating the elevation of displayed targets or for displaying targets only for specific predetermined elevations are provided. In addition, memory overload detection means are utilized.

OBJECTS OF THE INVENTION

An object of the present invention is to display a past history of target position in a radar display device along with the present position in such a manner as to highlight the presence of moving targets amid stationary targets and random noise.

Another object of the present invention is to present a pictorial indication of the direction and speed of a radar target.

Another object of the present invention is to save time and space in the memory storage of a multiple scan radar display.

A further object of the present invention is to allow direction and speed to be more accurately displayed in a multiple-scan radar display by reading only target data into the memory storage so that there will be more memory available and thus the resolution of the targets can be made finer.

A still further object of the present invention is to eliminate the need for a memory input buffer in a radar display device.

A still further object is to sequentially display and store radar target data in chronological order.

A still further object is to detect a memory overload condition when it occurs in the radar memory.

A still further object is to display targets at only specific predetermined elevations.

DETAILED DESCRIPTION OF THE PREFERRED EMBODIMENT

Figure 1:
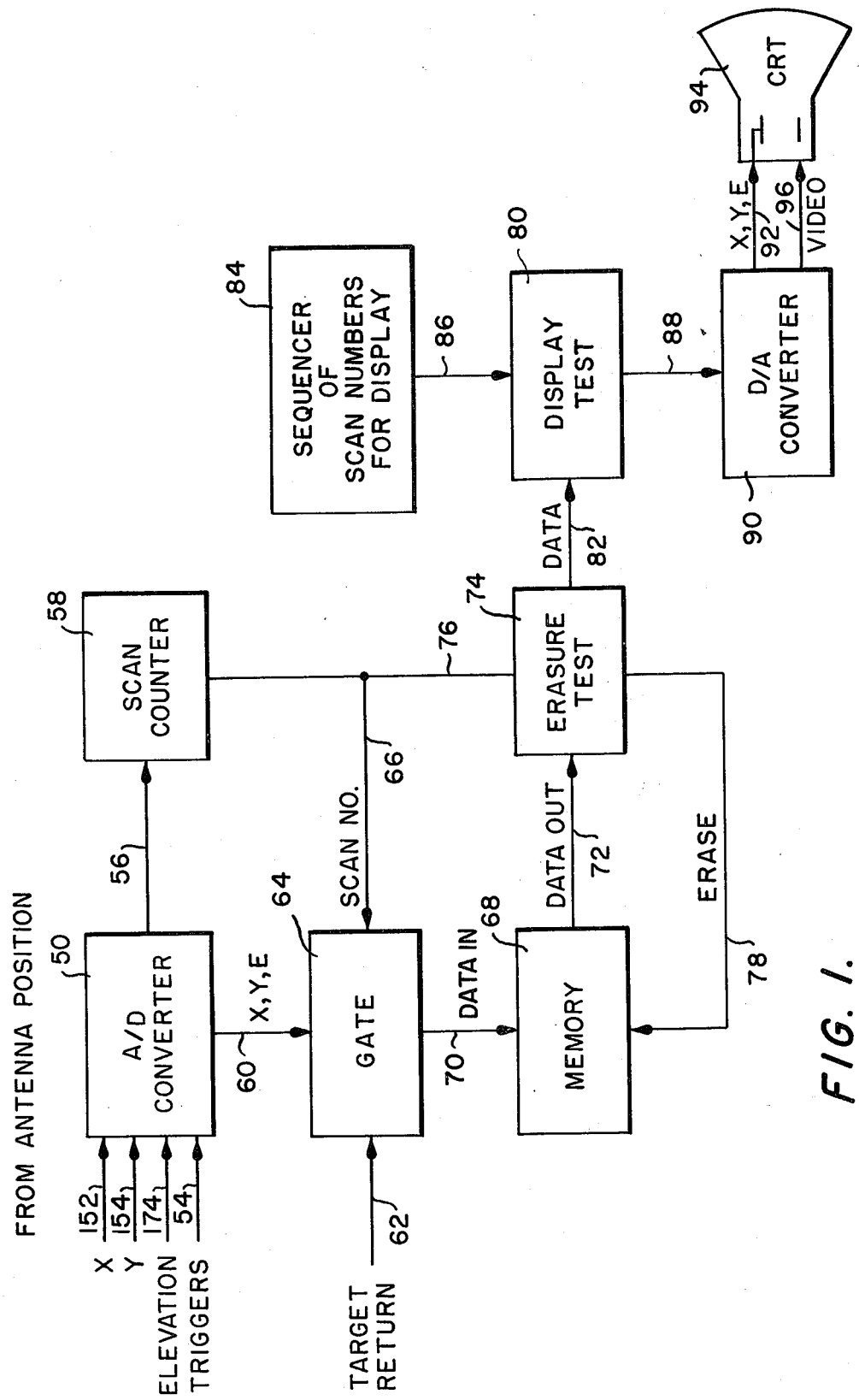
FIG. 1 is a functional block diagram of the multiple scan display (MSD) of the present invention.

Referring first to a functional block diagram of the present invention as shown in FIG. 1, X-Y and elevation data on the position of an antenna (not shown) is applied on lines 152, 154, and 174 to an A/D converter 50. Trigger signals on line 54 synchronize the A/D converter 50. A/D converter 50 delivers on line 56 a scan signal each time the antenna starts a new scan. A scan counter 58 stores the number of antenna scans. A/D converter 50 delivers on line 60 X and Y coordinate data as well as elevation data (E) in digital form. Upon receiving a target return on line 62, gate 64 samples the X coordinate, Y coordinate, and elevation data on line 60 as well as the scan number from the scan counter 58 applied via line 66. The sampled data is directly read into memory 68 via line 70. During the time periods data is not being read into memory 68, data is read out of memory 68 via line 72 and subjected to erasure test 74. Erasure test 74 compares the scan number of the target received from memory 68 via line 72 with the scan number received via line 76 from scan counter 58. If the target received from memory 68 is too old, the erasure test 74 generates an erase signal via line 78 which erases the received target from memory 68. If the target received from memory 68 is not too old, no erase signal is generated on line 78. Data applied via line 72 to erasure test 74 is also applied to display test 80 via line 82. The number of scans displayed on the CRT may differ from the number of scans stored in the memory 68. The sequences 84 provides the scan number of the targets that are to be displayed to display test 80 via line 86. Display test 80 compares the scan number from sequences 84 with the scan number received on line 82. If the scan number received on line 82 corresponds to the scan number from sequencer 84, then the target data is delivered on line 88 to the D/A converter 90. If the two scan numbers do not correspond no output on line 88 occurs. D/A converter 90 applies X-coordinate, Y-coordinate, and elevation data in analog form via line 92 to CRT 94 and via video line 96 to CRT 94.

Figure 18:
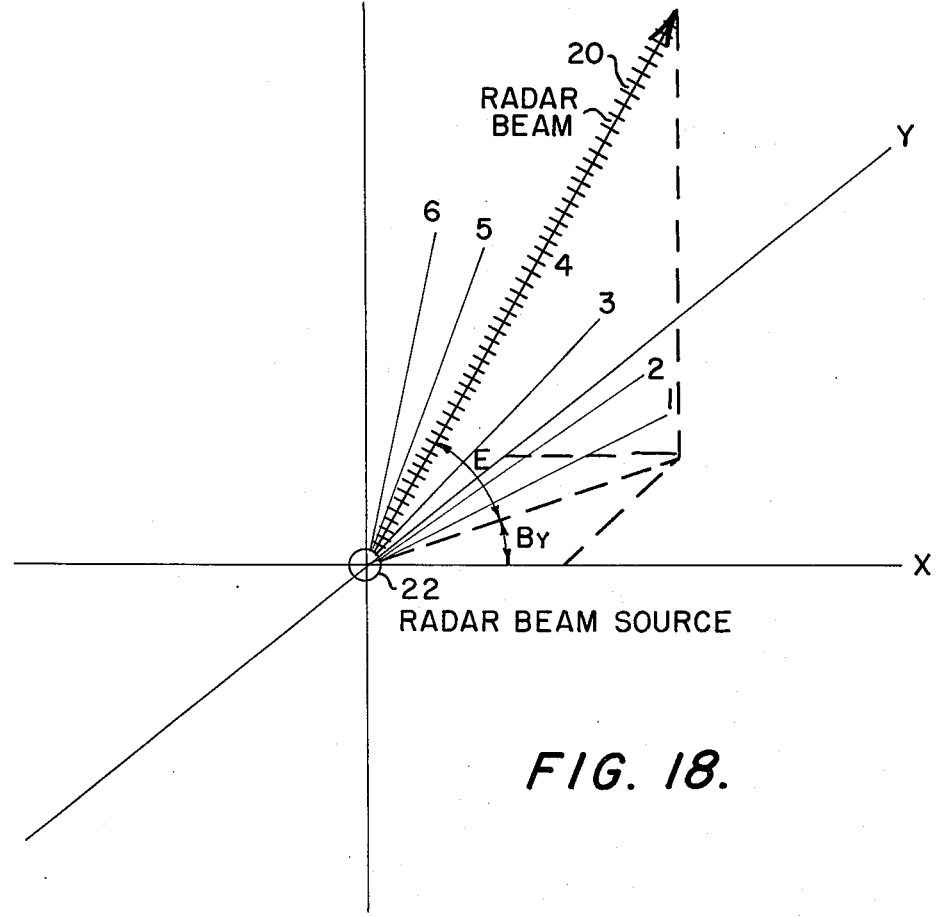
FIG. 18 is an illustration of the coordinate system used in the MSD system of the present invention.

FIG. 18 is an illustration of the coordinate system used in the present embodiment of this invention. The radar beam source is represented by the junction of the coordinate axes. The actual radar beam direction is illustrated by vector 20. The cosine and sine of the angle $B_y$ will give the radar beam direction relative to the X and Y axes respectively. The angle E that the radar beam makes with the X-Y coordinate plane gives the beam elevation. In this particular embodiment, there are six possible elevation angles that the radar antenna can take. In the figure the radar beam is at elevation 4. Each short line crossing the radar beam 20 at a right angle represents a range-clock increment. In this embodiment each time increment is equal to one-eighth of a mile.

Figure 2:
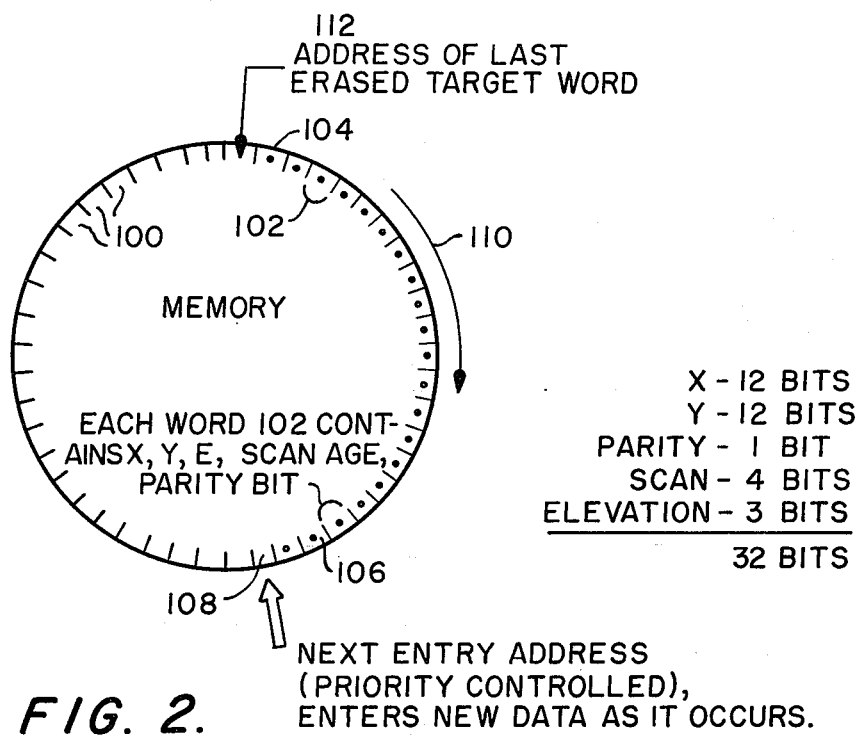
FIG. 2 is a representation of the organization of the memory of the present invention.
Figure 3A:
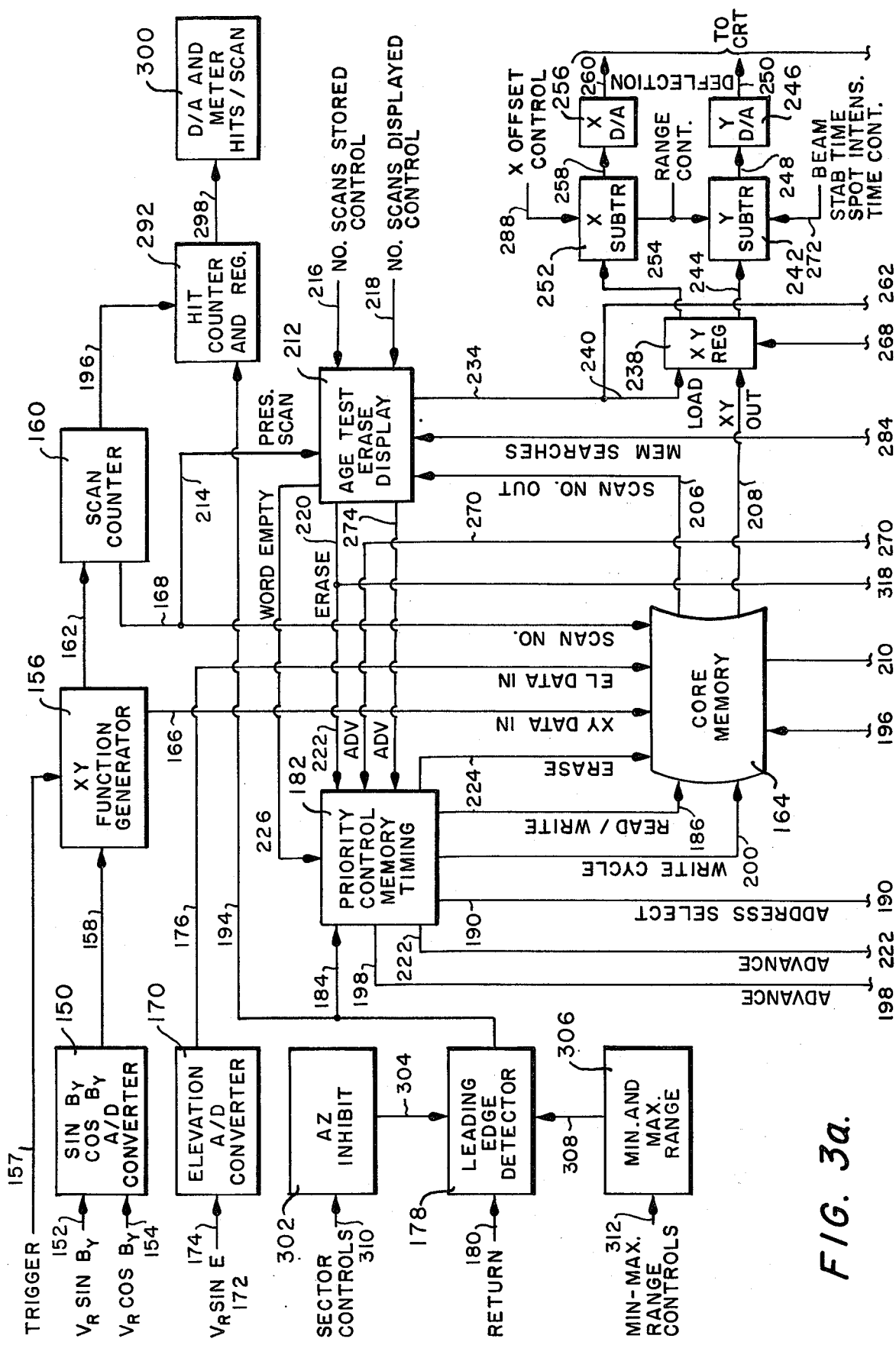
FIGS. 3a and 3b are detailed block diagrams of the MSD system of the present invention.
Figure 3B:
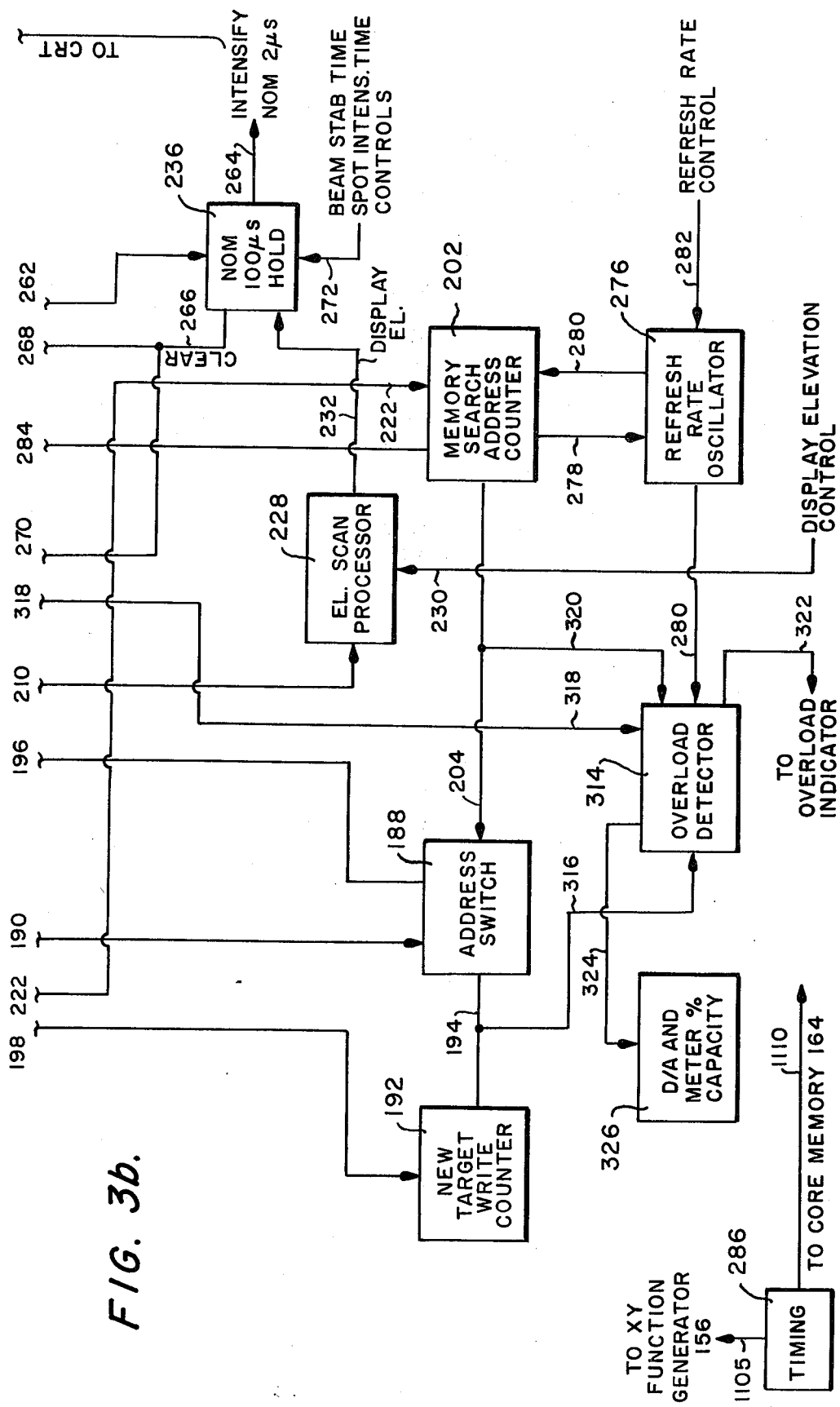

FIG. 2 indicates the time-ordering of memory 68 of FIG. 1. Each memory address location 100 contains one memory target word 102. Memory target words 102 are stored in time-order of receipt with increasing memory address locations. The oldest memory target word 102 is stored in memory address location 104. The last received memory target word 102 is stored in memory address location 106. The next memory target word 102 received will be stored in memory address location 108. Memory scanning for the erasure test 74 and the display test 80 of FIG. 1 cycles through the memory address locations 100 from the oldest memory target word 102 to the last-received memory target word 102 as indicated by arrow 110. Memory address location 112 contained the last erased memory target word 102. Memory may be compared to a list upon which new data is written at the bottom and old data is erased from the top. Each memory target word 102 contains parity, X-coordinate, Y-coordinate, scan-number, and elevation data. In the embodiment of FIG. 3, core memory 164 has 4,096 words, each 32 bits in length — 1 parity bit, 12 bits for the X and Y coordinate, respectively, 4 bits for the scan number, and 3 bits for the elevation beam number. Such 32-bit magnetic core memories are made available by the Ferroxcube Corporation.

Referring to FIG. 3, A/D converter 150 receives from an antenna (not shown) azimuth data in the form of D.C. voltages representative of the sine and cosine of the antenna position on lines 152 and 154, respectively. A/D converter 150 converts the D.C. voltage levels on lines 152 and 154 to digital data and at master trigger time applies this data to X-Y function generator 156 via line 158.

The X-Y function generator 156 successively adds the sine of the antenna position to its own accumulated sum for each and every 1.5-microsecond range clock, starting with zero range at master trigger time, to produce a linearly increasing (with range) value of the X coordinate. In an identical manner, the X-Y function generator 156, using the cosine of the antenna position, generates a linearly increasing (with range) value of the Y coordinate. The digital value of the X and Y coordinates determined by the X-Y function generator 156 is entered into the core memory 164 via line 166. A trigger signal is applied to X-Y function generator on line 157.

A scan counter 160 advances one count for each antenna scan when the antenna (not shown) passes due north. The count is advanced by a signal on line 162 from the X-Y Function Generator 156 and stored in digital form in counter 160. The scan number from scan counter 160 is entered into core memory 164 via line 168.

Elevation beam A/D converter 170 receives from an antenna (not shown) an input D.C. voltage 172 representing the sin E, via line 174. In this embodiment up to six different elevation beams are provided. Elevation beam A/D converter 170 converts the sin E D.C. voltage 172 into digital data. This digital data enters the core memory 165 via line 176.

Core memory 164 includes a core memory input, output and address register (not shown). The core memory input register (not shown) holds target words to be applied to memory such as the data on lines 166, 176, and 168 and a parity bit (not shown). Core memory output register (not shown) holds target words to be delivered from the memory 164 on lines 206, 208, 210 and a parity bit (not shown). The address register of the core memory holds the address in the memory that is to be read from or written into.

A target return enters Leading Edge Detector 178 on line 180. The output of Leading Edge Detector 178 then signals Priority Control, Memory Timing 182 on line 184 that a target has been detected. Priority control, memory timing 182 synchronizes the leading edge detected target to a memory clock (not shown). Priority Control, Memory Timing 182 then signals Address Switch 188 on line 190 to furnish the Address Register of the Core Memory 164 with the memory address in which the new target data will be written and stored. This address is generated by New Target Write Counter 192 which advances by one count for every new target. The address at that particular count of the New Target Write Counter 192 is entered into Address Switch 188 on line 194. Address switch 188 enters this address into the address register of Core Memory 164 on line 196. At the same instant Priority Control, Memory Timing 182 signals Core Memory 164 on line 186 that a write cycle is upcoming. Priority Control, Memory Timing 182 then signals Core Memory 164 on line 200 to initiate the write cycle, thereby writing into the memory at the address contained in the address register (not shown) of core memory 164, the target word contained in the core memory input register of Core Memory 164 i.e. the new targets X coordinate, Y coordinate, elevation, and scan number. Read cycle signal on line 186 is inhibited during this time. Priority control, memory timing 182, at the same instant, signals New Target Write Counter 192 on line 198 to advance by one thereby properly setting the address in the memory for the next target return. Writing in is destructive thereby eliminating old data should a memory overload condition exist.

During the time periods when core memory 164 is not occupied with writing in new targets, the stored targets are systematically extracted from core memory 164 and subjected to erasure and display tests. Total memory time used for writing in new targets compared to the total time available per antenna scan is typically 0.015% leaving 99.985% of available time for memory read cycles.

Memory search address counter 202 contains the address of the oldest target word for the erase and display tests. Priority Control Memory Timing 182 signals address switch 188 on line 190 to supply the address register (not shown) of Core Memory 164 with the address stored in Memory Search Address Counter 202. The address stored in Memory Search Address Counter 202 is entered into Address Switch 188 on line 204. At the same instant Priority Control, Memory Timing 182 signals the Core Memory 164 on line 186 that a read cycle is upcoming. Write cycle signal on line 186 is thus inhibited. Next Priority Control, Memory Timing 182 signals core memory 164 on line 200 to initiate the read cycle, thereby reading the target word at the address contained in the address register (not shown) of Core memory 164 out into the memory output register (not shown) of Core Memory 164.

The scan number of the target word contained in the memory output register (not shown) of Memory 164 is entered on line 206 to age test erase display 212. The present scan number is entered on line 214 to Age Test Erase Display 212 from Scan Counter 160. The target is either displayed, erased or neither.

ERASE FUNCTION OPERATION

A signal controlling the number of scans to be stored is entered on line 216 to Age Test Erase Display 212. Age test erase display 212 subtract the scan number of the target word entered by line 206 from the memory from the present scan number entered by line 214. This subtracted number is then compared with the number of scans to be stored from line 216. If the subtracted number is greater than the number of scans to be stored an erase signal is produced on line 220. If the subtracted number is equal to or less than the number of scans to be stored no erase signal is delivered on line 220.

The erase signal on line 220 is applied on line 222 to Priority Control Memory Timing 182. Priority Control Memory Timing 182 then inhibits the advance signal on line 222 thereby retaining in memory search address counter 202 the address of the target word so that erasure may take place during the next available memory cycle. Note a memory read cycle is used to either read a target word or erase aa target word. Next, Priority Control, Memory Timing 182 signals Address Switch 188 via line 190 to load the memory address register of Core Memory 164 with the address contained in Memory Search Address Counter 202. At the same instant, Priority Control, Memory Timing 182 signals on line 186 Core Memory 164 that a read cycle is upcoming. Next, Priority Control Memory Timing 182 signals Core Memory 164 via line 224 to initiate the erase cycle.

The erase cycle is a half-cycle read mode. During a half-cycle read operation a target word is read from the appropriate cores but not restored. At the same instance, Priority Control Memory Timing 182 increments Memory Search Address Counter 202 via an advance signal on line 222.

If the target word is empty, i.e. has a zero scan number, the age test erase display 212 applies a word empty signal on line 226 to Priority Control, Memory Timing 182. Upon receipt of a word empty signal on line 226, Priority Control, Memory Timing 182 increments Memory Search Address Counter 202 via line 222 thereby preparing for the next available read cycle.

Elevation data from a target word in the memory output register (not shown) of Core Memory 164 is entered on line 210 into elevation beam processor 228. Display Elevation Control Signal which determines which elevations are to be displayed is entered on line 230 to elevation beam processor 228. If the target word indicates a target at an elevation to be displayed, Elevation Beam Processor 228 enters on line 232 to beam stabilization 236, an Elevation Display Signal.

A signal controlling the number of scans to be displayed is applied on line 218 to Age Test Erase Display 212. Age Test Erase Display 212 subtracts the scan number of the target word from the present scan number of line 214. This subtracted number is then compared with the number of scans to be displayed on line 218. If the subtracted number is greater than the number of scans to be displayed, a display signal is applied on line 234. If the subtracted number is equal to or less than the number of scans to be displayed no display signal is applied on line 234.

The display signal on line 234 enters the X-Y Register 238 on line 240. When the display signal is received on line 240, the X and Y coordinate data of the target word in the memory output register (not shown) of Memory 164 is loaded into X-Y Register 238 via line 208. The Y coordinate data is then entered into the Y Subtractor 242 on line 244. The Y Subtractor 242 subtracts an amount indicated by the Y offset control on line 290 from the Y coordinate target data. The Y coordinate data is applied to X Subtractor 252 which acts to subtract a desired X offset amount indicated by the X offset control signal on line 288 from the X coordinate of the target data. Thus the entire display on the CRT can be offset in the X and/or Y direction by a known distance. This offset feature permits the display to be expanded to permit closer scrutinization of a distant small area. Then the difference signal from the Y Subtractor 252 is applied on line 258 to the X D/A Converter 256. The Y D/A Converter 256 converts the Y coordinate data to a D.C. voltage which is applied to the Y deflection plates of a CRT to position the CRT beam. Likewise, the difference signal from the Y Subtractor 242 is applied on line 248 to Y D/A Converter 246 which acts to produce a D.C. voltage to be applied to the Y deflection plaltes of a CRT to position the CRT beam in the Y direction.

The display signal on line 234 is also applied to Beam Stabilization 236 on line 262. If a display elevation signal on line 232 and a display signal on line 262 are received by Beam Stabilization 236, a time delay of typically 100 microseconds occurs. This time delay allows enough time for the CRT beam to settle at the new point. At the end of the time delay a variable length video pulse that intensifies the CRT at the X-Y position of the target is applied on line 264 from beam stabilization 236. At the end of the variable length pulse beam stabilization 236 applies a clear signal on line 266. The clear signal on line 266 is applied to the X-Y Register 238 on line 268. The clear signal on line 268 clears the X-Y Register 238 whereby the X-Y Register 238 is now ready for the next target word. The clear signal on line 266 also is applied on line 270 to the Priority Control, Memory Timing 182. Upon receipt of clear signal on line 270, Priority Control, Memory Timing 182 applies on line 222 an advance signal to Memory Search Address Counter 202. Beam stabilization time and spot intensity time are controlled in the Beam Stabilization 236 by a signal on line 272.

If the Age Test Erase Display 212 determines that a target word is neither too old to erase nor too old to display, it sends an advance signal on line 274 to the Priority Control, Memory Timing 182. Upon receipt of advance signal on line 274, Priority Control, Memory Timing 182 applies on line 222 an advance signal to Memory Search Address Counter 202.

In this embodiment Core Memory 164 is a 4096 word by 32 bit magnetic core memory with a 3 microsecond full cycle time (read/restore or clear/write) and a 2 microsecond half cycle time (read only or write only). A memory of the type described is readily available commercially.

The minimum search time of Core Memory 164 is 4096 × 3 microseconds or about 12 milliseconds. Thus, the maximum rate at which Core Memory 164 may be searched is 80 Hz. 80 Hz is fast enough to refresh a display without causing visible flicker since the eye integrates picture rates above 30 Hz. Refresh Rate Oscillator 276 controls the refresh rate of the display. Refresh Rate Oscillator 276 internally generates a low frequency signal, typically 30 Hz, by a tunable oscillator (not shown). When the Memory Search Address Counter 202 has completed one complete search of the Core Memory 164 which happens after a search of 4096 target words, a signal is applied on line 278 to the Refresh Rate Oscillator 276. The signal received on line 278, is phase compared with the low frequency signal generated by the tunable oscillator of Refresh Rate Oscillator 276. The frequency of the low frequency signal generated by the tunable oscillator of the Refresh Rate Oscillator 276 is controlled by a Refresh Rate Control Signal applied on the line 282 to Refresh Rate Oscillator 276. If the tunable oscillator of refresh rate oscillator 276 has not completed a cycle by the time word 4096 is reached a signal is generated on line 280 from Refresh Rate Oscillator 276 to Memory Search Address Counter 202. Memory Search Address Counter then generates on line 284 a signal to Age Test Erase Display 212. Upon receipt of the signal on line 284, Age Test Erase Display 212 inhibits the output of signals on lines 220, 274, 234, and 226, thus Memory Search Address Counter 202 cannot advance and no display can occur. When the tuned oscillator (not shown) of Refresh Rate Oscillator 276 completes its cycle, Memory Search Address Counter 202 is cleared via a signal on line 280. At the same instant the signal on line 284 is inhibited, thus Memory Search Address Counter 202 can advance allowing the search of Core Memory 164. The reason the Refresh Rate Oscillator 276 is used to inhibit the advance of the Memory Search Address Counter 202 and thus slow down the refresh rate on the CRT if the memory is being searched faster than the Refresh Rate Oscillator cycle is to avoid burn-in on the CRT screen. If the frequency of the tunable oscillator of Counter 276 is greater than the frequency at which Core Memory 164 can be searched then Core Memory 164 is searched at the fastest rate possible.

Timing 286 contains a range clock (not shown) and a memory clock (not shown). The range clock (not shown) is synchronized to the system master trigger. The memory clock (not shown) is synchronized to the range clock (not shown) to maintain synchronization between Memory Timing 182 and its input data.

The embodiment gives a visual indication of the number of bits per scan. Leading Edge Detector 178 applies a signal to Hit Counter and Register 292. Hit Counter and Register 292 counts and stores the number of target returns. The scan number is applied on line 296 to Hit Counter and Register 292 from Scan Counter 160. Hit Counter and Register 292 digitally divides the number of target returns by the number of scans and applies this number on line 298 to the D/A Converter and Meter 300. D/A Converter and Meter 300 converts the digital number on line 298 to a D.C. voltage level. This D.C. voltage level drives a meter also located in the D/A Converter and Meter 300. The meter's scale gives the number of hits per scan.

The embodiment has the capability of displaying targets only from a predetermined azimuth sector and range. Azimuth Sector Inhibit 302 signals Leading Edge Detector 178 to inhibit detection of target returns when the antenna is not in the azimuth sector selected for display. Azimuth Sector Inhibit 302 applies a signal to Leading Edge Detector 178 on line 304. A signal to control the azimuth sector is applied to Azimuth Section Inhibit 302 on line 310. Minimum-maximum range control signal is applied on line 312 to control the Minimum and Maximum Range 306. Minimum and Maximum Range 306 applies a signal to Leading Edge Detector 178 on line 308. The signal on line 308 inhibits the Leading Edge Detector 178 detection function when the data is not within the designated range time period (when the range time is not within some designated minimum or maximum range time).

The Overload Detector 314 has two functions: to sense a memory time overload, to sense a memory space overload.

A time overload occurs when the memory search time exceeds the Refresh Rate Oscillator frequency (30 MHz). Thus a Refresh Rate Oscillator frequency pulse (Disable Memory Search Address Counter pulse on line 280 of FIG. 14) is applied as one input on line 280 to a flipflop within the Overload Detector 314. The other input to this flipflop comes from Memory Search Address Counter on line 320 and indicates when the 4096 the word of the Core Memory 164 has been searched. If the Refresh Rate Oscillator pulse occurs before the memory search complete pulse from the Memory Search Address Counter, then there is a memory time overload.

A memory space overload occurs when the number of erase pulses subtracted from the number of write pulse is reached 4096, the memory capacity. Thus Overload Detector 314 also contains an up-down counter which counts up on new target write signals from line 316, and counts down on erase signals from line 318.

The present count in this up-down counter is applied to D/A and Meter percent Capacity 326 on line 324. The value of this count merely indicates the capacity in the Core Memory 164 at the present moment.

Figure 4:
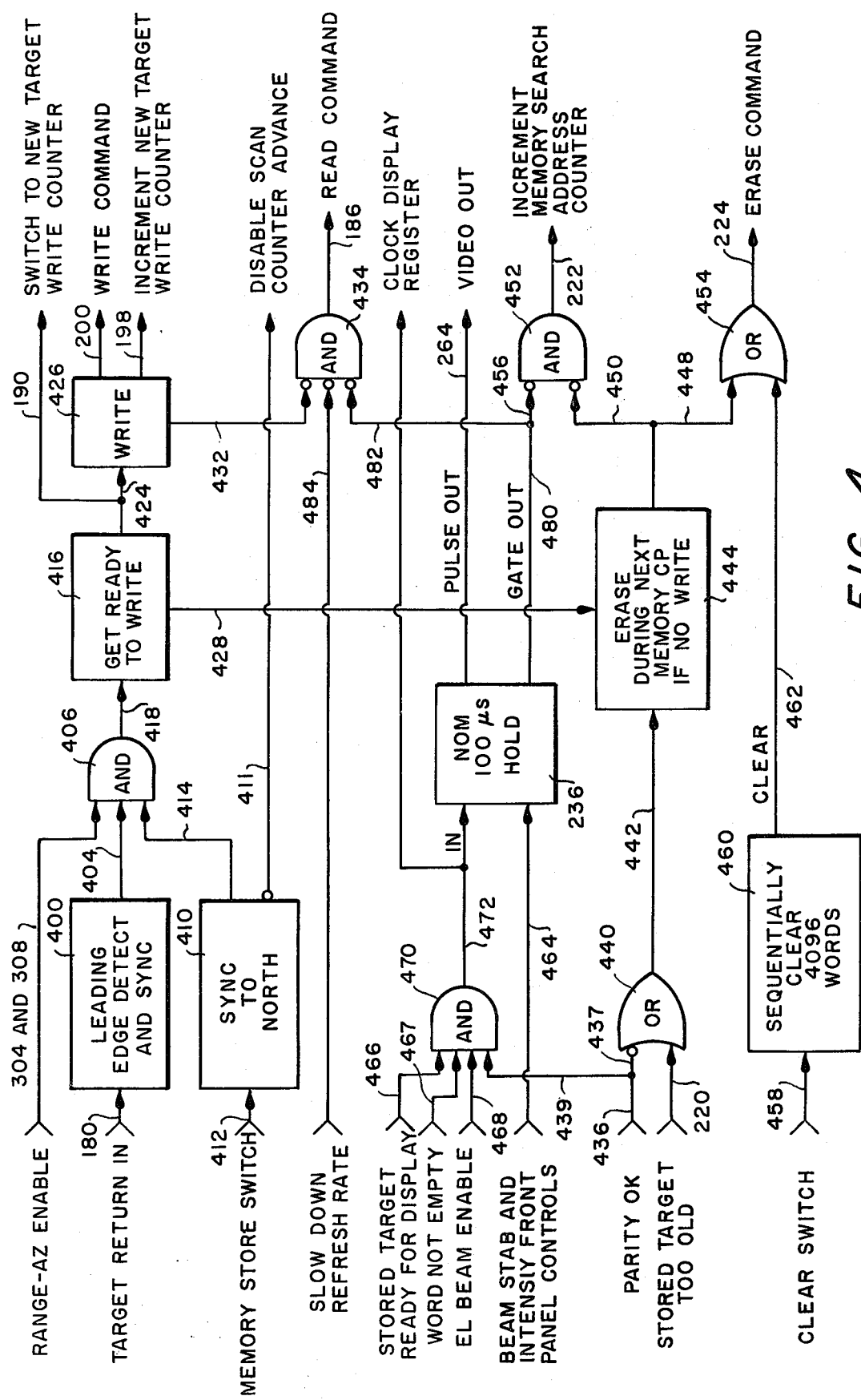
FIG. 4 is a flow chart diagram functionally describing the operation of the priority control, memory timing and its relation to the rest of the MSD system.

FIG. 4 is a flow chart functionally describing the general operational timing of the Multiple Scan Display of FIG. 3 and in particular the operation of the Priority Control, Memory Timing 182 of FIG. 3.

When an input radar target return is received at Leading Edge Detector and Sync 400, it is leading-edge detected, synchronized to the memory clock of Core Memory 164, and then applied as one input to an AND gate 406. The azimuth enable signal from line 304 and the range enable signal from line 308 are applied as another input to AND gate 406 when the target return is within the designated range and azimuth sectors. The third input to AND gate 406 is from Symc to NORTH 410 which operates such that when the Memory Store input of line 412 is enabled, then Sync to North 410 enables line 414 whenever the antenna beam is directed due north. Thus until the Multiple Scan Display of FIG. 3 is synchronized with the antenna to due north, AND gate 406 is not enabled and thus targets cannot be written into Core Memory 164. Also until this synchronization occurs, the Scan Counter 160 will be prevented from advancing by line 411. The count in the Scan Counter 160 will thus be held until a WRITE COMMAND on line 200 records this count in Memory 164. When AND gate 406 is enabled it sends a pulse to Get Ready to Write 416 which is a flipflop which acts to (1) set the flipflop 426 by line 424, (2) send a signal to Address Switch 188 on line 190 (the signal on line 190 forces Address Switch 188 to enter the address at which the target return will be entered in the Core Memory 164 into the address register of Core Memory 164), (3) applies a signal on line 428 to Erase During Next Memory Cycle IF NO WRITE 444 to inhibit the erasing function. Upon the occurrence of the next memory clock period the flipflop of Write block 426 applies a WRITE COMMAND on line 200 to Core Memory 164. This one clock period delay after a target return before giving the WRITE COMMAND is required to allow time for the address register of the Core Memory 164 to switch from the address last applied by Memory Search Address Counter 202 while the memory data was being age tested to determine if it should be erased to the address from the Address Switch 188 designating where the new target return will be located in the Core Memory 164. Thus, when the next clock period does occur and the WRITE COMMAND is generated, the X and Y coordinates, the scan number, and the range will all be entered and stored in Core Memory 164. While this is occurring the READ COMMAND from line 186 is inhibited by not enabling the line 432 input to AND gate 434. The New Target Write Counter 192 is also advanced one count by the Write block 426 on line 198 so that it will be ready to apply this new address count to the Address Switch 188 when the next new target return is received.

A memory read cycle is used to either read data or erase data. Old data is erased every scan to prevent ambignity of information. In the embodiment of FIG. 3 there are 4 memory hits assigned to keep a record of the scan number, enough to record 16 States of scan counter 160, FIG. 3. Every 16th scan, scan counter 160, FIG. 3, repeats. If old data was left in core memory 164, FIG. 3, without an identification tag it would be re-displayed until it was finally cleared out by new data going in at its address. An erase command (line 434, FIG. 4) is accomplished by initiating a half-cycle memory read mode. During a half-cycle read operation a target word is read from the appropriate cores, but not restored. This leaves the states of those cores at zero.

An erase command (line 434, FIG. 4) may be initiated in two ways: by a signal from Age Test Erase Display 212, FIG. 3, indicating that the stored target being read from memory is too old (line 220, FIG. 4); or by a signal from a parity checker (not shown) indicating that data is incorrect (lines 436 and 437 to OR 440 and line 442, FIG. 4). A flipflop is then set (block 444, FIG. 4) to erase the data at that address on the next available read cycle. Thus when the next cycle occurs OR gate 454 will be enabled by line 448 and an ERASE COMMAND will be given on line 224 to the Core Memory 164. If a write cycle is about to be initiated (line 200, FIG. 4) the ERASE COMMAND on line 224 will be held up by the inhibit signal on line 428 which inhibits are flipflop of block 444 until all the WRITE cycles are over. Meanwhile, Memory Search Address Counter 202, FIG. 3, is prevented from incrementing (lines 446, 450, 222, and 452; FIG. 4), so that the address that was to be erased is "remembered" and can be erased on the next possible erase cycle.

Core Memory 164, FIG. 3, may be sequentially cleared (block 460 to line 462 to OR 454, FIG. 4) if a clear switch (line 458, FIg. 4) is set.

A full-cycle read operation (read-restore) is used for the purpose of examining the age of the stored target words. This may result in either the target word being erased as described supra or being displayed, described as follows. Targets are displayed on the basis of age to effect the sequential characteristic of the multiple scan display, FIG. 3. When (1) a Stored Target Ready for Display Signal (line 466, FIG. 4) is received from Age Test Erase Display 212, FIG. 3, (2) a parity check signal is received (lines 436 and 439, FIG. 4), (3) an elevation beam enable is received (line 468, FIG. 4) from elevation beam processor 228, FIG. 3, indicating that the target is at the elevation to be displayed, (4) the WORD NOT EMPTY input of line 467 indicates that data is present in the Core Memory 164 by generating a logic 1 when any one of the 32 bits in the core memory address of Core Memory 164 is non-zero, then a variable delay monostable multivibrator 236 (NOM 100 s HOLD of FIG. 3) is set by AND 470 on line 472. The duration is determined by the setting of the beam stabilization time front panel control (line 464, FIG. 4), typically 100 microseconds. Meanwhile X-Y register 238, FIG. 3, is loaded with coordinate data and the CRT beam is redirected to the new information point. The purpose of the beam stabilization delay of block 236 is to allow enough time for the CRT beam to settle at the new point. During this time, incrementing of the Memory Search Address Counter 202, FIG. 3, (lines 480, 456, 455, and 452; FIG. 4) and further read cycles (lines 480, 482, and 433; and 434; FIG. 4) are held up so that other data that may be ready for display is not skipped. At the end of the delay, another monostable multivibrator (block 236, FIG. 4) controlled by the intensity front panel control (line 464, FIG. 4) is set and timed out to produce the output video pulse 264 that intensifies the CRT at the X-Y position of the target.

Also, a read command (line 186, FIG. 4) is prevented after all of core memory 164, FIG. 3, has been read out and subjected to erase and display tests, until refresh rate oscillator 276, FIG. 3, has completed one cycle (line 484, FIG. 4). The purpose of the refresh rate oscillator signal is to slow down the refresh rate if the memory is being searched too fast to avoid target burn-in on the CRT screen.

Figure 5:
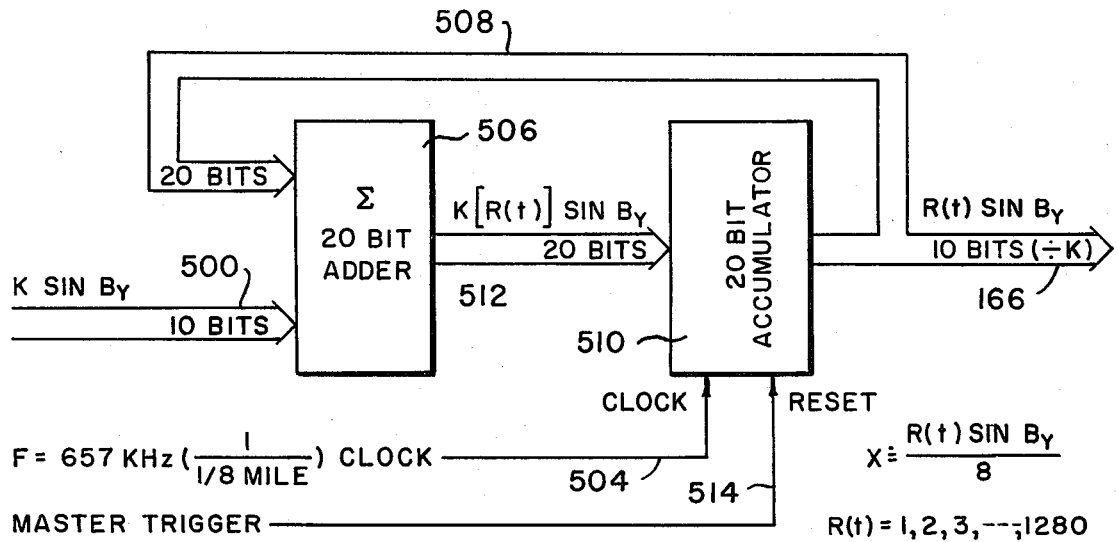
FIG. 5 is a block diagram of a digital X function generator of the X-Y function generator of the MSD system.

FIG. 5 is detailed block diagram of the X function generator of X-Y Function Generator 156, FIG. 3. The Y-function generator is identical in structure and function to the X-function generator and will not be described.

As discussed in the summary, supra, the X and Y function generators eliminate the need for a buffer by providing the X and Y coordinates of the target immediately at detection. At target detection time the coordinate data is simply written into memory and the Write Counter 192 is advanced to be ready for the next target.

In order to provide this constantly up-to-date X coordinate a digital integration process is used. The position of the antenna beam at master trigger time is recorded. To get the X coordinate the sine of the antenna beam angle $B_y$ is successively added to itself. These successive additions are initiated at zero range and are clocked by the range clock (one-eighth mile range clock in this embodiment). Thus after the first one-eighth mile range clock the X coordinate is 1 sin $B_y$. After the next one-eighth mile range clock, X = 2 sin $B_y$. After 900 one-eighth mile range clocks X = 900 sin $B_y$. The Y coordinate is thus measured in one-eighth miles. IF the X coordinate in miles is desired, the X coordinate is merely divided by eight.

Thus the multiplication process (R sin $B_y$) needed to get the X coordinate is actually performed by these successive additions of the sin $B_y$ and no buffer is required.

FIG. 5 is a block diagram of how this successive addition can be performed digitally. The antenna beam position at master trigger, K sin $B_y$, is brought in as an input to the 20 bit adder 506 on line 500. K is a constant that is later divided out. Adder 506 adds K sin $B_y$ to the accumulated sum from line 508. This number is then applied to the 20 bit accumulator 510 which acts to hold this accumulated sum and apply it as feedback to the 20 bit adder 506 on line 508 and apply it on line 166 as an output to the Core Memory 164. This output on line 166 is truncated by the 10 least significant bits thus canceling out the the constant K to give the X coordinate R sin $B_y$. The Accumulator 510 is clocked by the one-eighth mile range clock on line 504 and it is reset at master trigger time (zero range) by a pulse on line 514. Thus a linearly increasing digital number is generated starting with zero at master trigger time and ending with a value equal to 8R sin $B_y$. Thus $X = 8R$ sin $B_y/8$.

Figure 6:
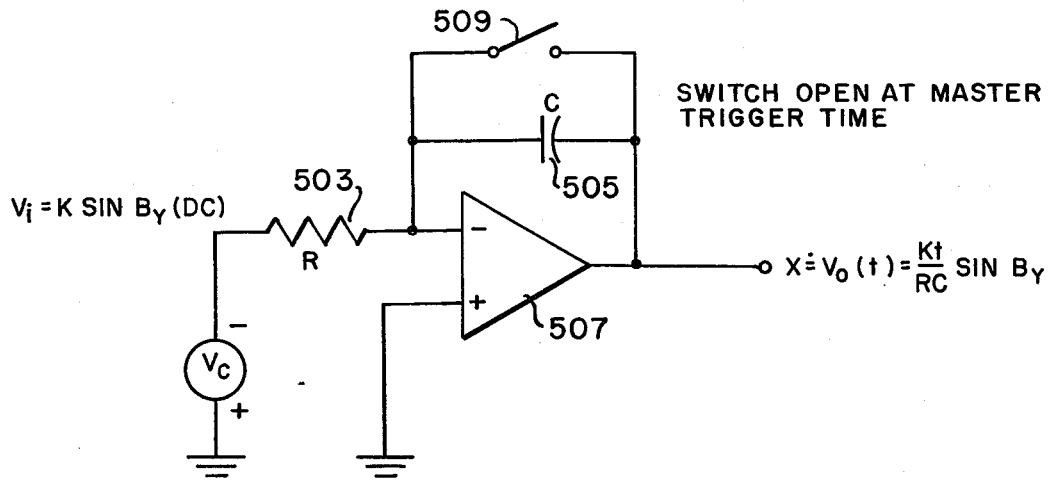
FIG. 6 is an analog representation of the X function generator of the X-Y function generator of the MSD system.

An analog representation the Y Function Generator is shown in FIG. 6 is the Miller sweep generator. The sweep is reset at master trigger time by opening the switch 509 in order to synchronize the successive additions with the radar transmission. When K sin $B_y$ is applied as an input to the Miller sweep generator 507, the voltage output is kt/RC sin $B_y$ where K is a constant, $t$ is time, R is the resistor value of resistor 503, C is the capacitance value of capacitor 505. K sin $B_y$ is a constant D.C. value kt/RC is equivalent to Range. Thus X = (Range)(sin $B_y$) miles where Range is a function of time and is a linearly time increasing integer. Thus X is a smoothly increasing value as opposed to the digitally increasing value of the Digital X Function Generator of FIG. 5.

Figure 7:
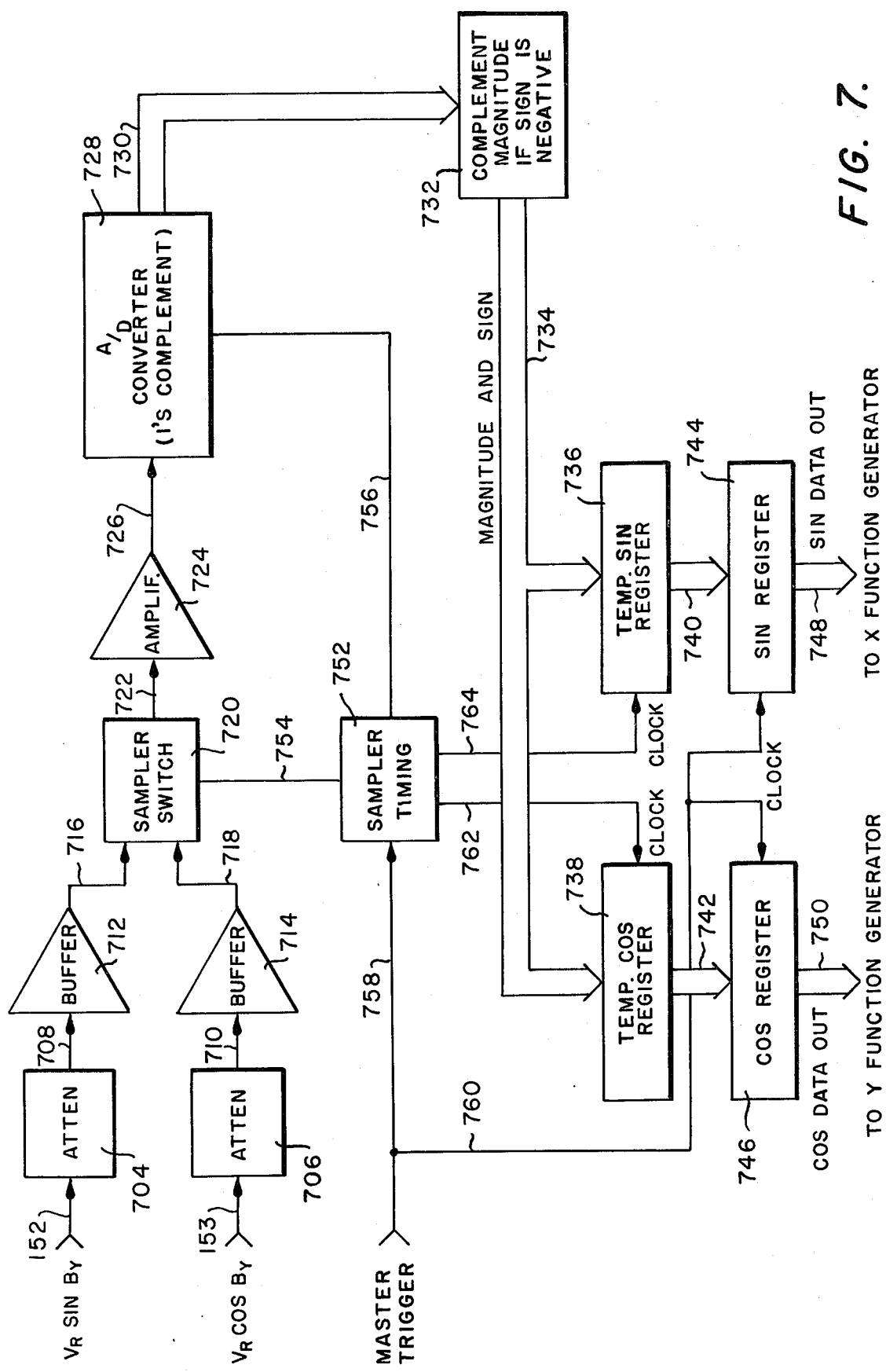
FIG. 7 is a detailed block diagram of the A/D converter of FIG. 3.

FIG. 7 is a detailed block diagram of A/D Converter 150 of FIG. 3. Referring to FIG. 7 input antenna azimuth data in D.C. voltage form is applied on lines 152 and 154. X coordinate data is taken from a line 152 and Y coordinate data is taken from line 154. Both inputs are attenuated by atten 704 and atten 706 and then applied on lines 708 and 710 to the Buffers 712 and 714. Buffers 712 and 714 apply inputs to Sampler Switch 720 on lines 716 and 718. Sampler Switch 720 can be a FET hybrid SPDT switch. Sampler Switch 720 time multiplexes data on lines 716 and 718 into the AID Converter 728. Multiplexing saves the cost of two A/D converters. The output of Sampler Switch 720 on line 722 is applied to the Amplifier 724. The output of Amplifier 724 is applied to A/D Converter 728.

Sampler Timing 752 controls Sampler Switch 720 via signals on line 754. Sampling is initiated at master trigger time by a pulse on line 758. Then Sampler Timing 752 signals Sampler Switch 720 to gate data on line 718 to A/D Converter 728. Alternately, data of line 716 could have been gated first. After a time dealy, typically 100 microseconds, to allow A/D Converter 728 time to settle, the Sampler Timing signals A/D Converter 728 on line 756 to sample data. After a second time delay, typically 22 microseconds, the Sampler Timing 752 clocks on line 762 the data from line 734 into Temp. Cos Register 738. The data of line 734 is the data from the output of A/D converter 728 on line 730 that has been complemented if negative by Complement-Magnitude-if-Sign-is-Negative 732. After a third time delay, typically 100 microseconds, Sampler Timing 752 signals Sampler Switch 720 via line 754 to gate data on line 716 to A/D Converter 728. The operation is then identical to that for the data on line 718 except Sampler Timing 752 clocks on line 764 the data on line 734 into Temp. Sin Register 736.

Temp. Cos Register 738 has an input to Cos Register 746 on line 742. Temp. Sin Register 736 has an input to Sin Register 744 on line 740. At the next master trigger time the data in Temp. Cos Register 738 and Temp. Sin Register 736 is clocked (line 760) into the Cos Register 746 and into the Sin Register 744, respectively. Cos Register 746 applies an output on line 750 to the Y function generator, FIG. 5, while the Sin Register 744 applies an output on line 748 to X function generator, FIG. 5. The Cos Register 746 and Sin Register 744 are needed to keep the data input stable for each sweep into the X and Y Function Generators.

Figure 8:
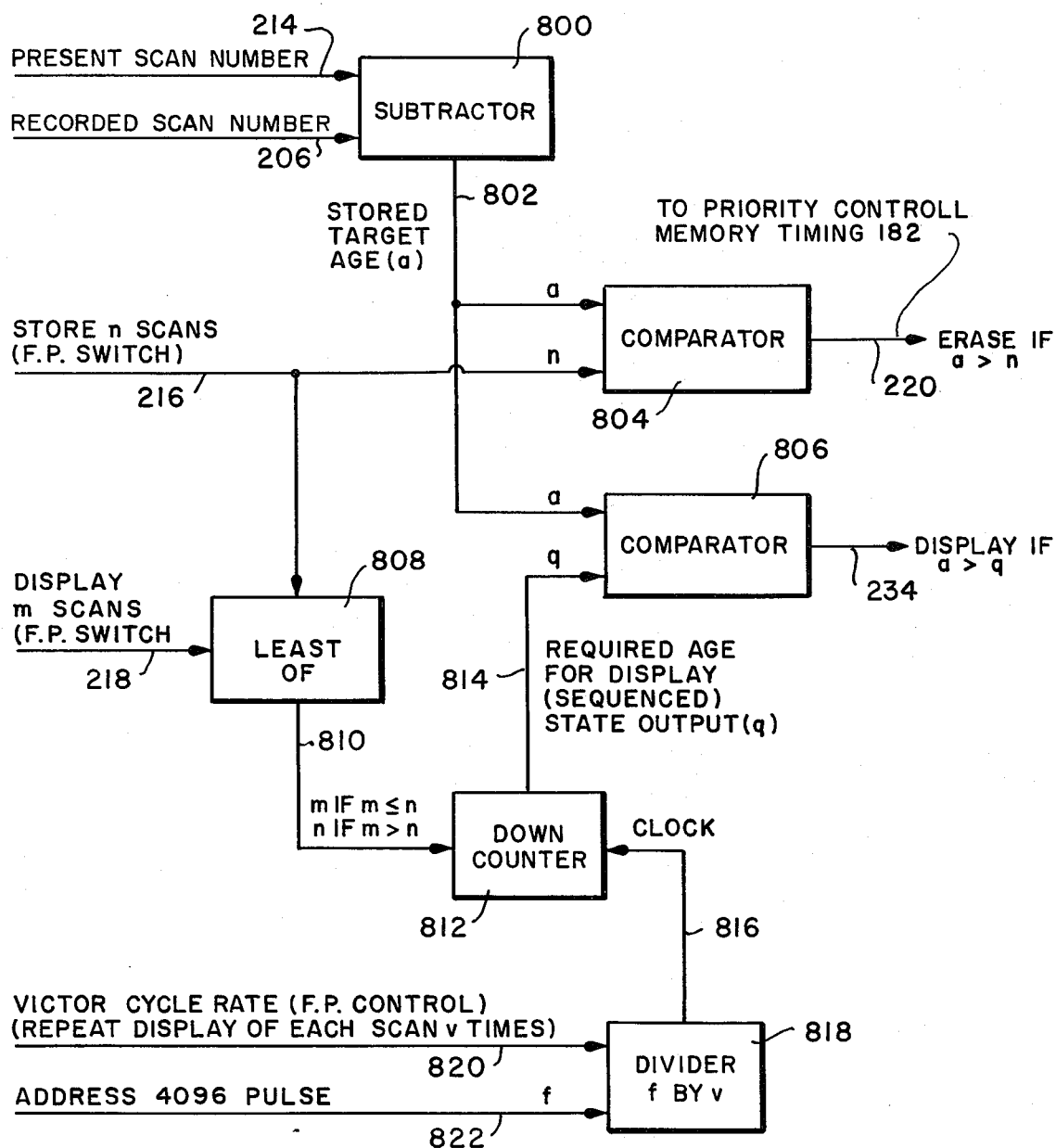
FIG. 8 is a block diagram of the Age Test Erase Display of FIG. 3 of the present invention.

FIG. 8 is a block diagram of the erase and display circuitry of the Age Test Erase and Display 212 of FIG. 3. Stored target age is the basis for the display or erase operation. The Multiple Scan Display displays data by sequencing the targets on the CRT from past scans in such a way as to exaggerate the distance a moving target travels from scan to scan. This exaggerated motion is repeated over and over again at some desired target vector cycle rate. Stationary targets show-up as non-moving display points while moving targets appear as vectors with a rythmic flashing (caused by the intensity signal on line 264 from NOM 100 µs HOLD 236).

To accomplish this type of display stored targets are read from the Core Memory 164 at a rate determined by the access time of the Memory 164, in this case every 3 microseconds. This rate thus allows a minimum search time of 4096 × 3 microseconds or 12 millseconds. The maximum rate at which the memory may be searched is about 80 Hz.

As each target is read from Memory 164 it is subjected to tests for its age. Thus in FIG. 8 the recorded scan number of the target data is brought in on line 206 from Core Memory 164. This can number is subtracted from the present scan number brought in on line 214 from the Scan Counter 160 of FIG. 3 in Subtractor 800. The output of Subtractor 800 on line 802 represents the age of the target word read from memory relative to the present scan number. Line 802 applies this output to Comparator 804 and Comparator 806.

A signal indicating the number of scans to be stored, n, in Core Memory 164 of FIg. 3 is applied to Comparator 804 on line 216. If the age of the stored target word from line 802 is greater than the number of scans n to be stored (line 216), then Comparator 804 generates an output erase signal on line 220 Priority Control Memory Timing 182, FIG. 3.

The stored target age on line 802 is also compared to a number, $q$, the required age for display in the Comparator 806. The required age for display, $q$, is the age of the scan that is to be displayed at that time in order to provide the proper sequence of targets. Upon comparison, if the two numbers, the stored target age a and the required age for display $q$ are equal, them Comparator 806 applies on line 234 a display signal to the X-Y Register 238 and to the NOM 100 µs HOLD 236. This number $q$ is computed as follows. For proper sequencing the greatest age scan that is to be displayed should be displayed first. Thus the required age for display, $q$, is made equivalent to $m$, the number of scans to be displayed if the number of scans, $n$, stored in Memory 164 is equal to or greater than $m$. If the number of scans stored, $n$, is less than the number of scans to be displayed, then $q$ is made equivalent to $n$. Thus in FIG. 8, Least of 808 compares the number of scans to be displayed, $m$, on line 218 to the number of scans stored $n$, on line 218. If $m \leq n$, then Least of 808 applies a signal indicating the number of scans to be displayed, $m$, to Down Counter 812. If $n < m$, then Least of 808 applies a signal indicating the number of scans stored, $n$, to Down Counter 808.

Down Counter 812 acts to count down the age to be displayed from the greatest age to be displayed down. Down Counter 812 is a variable modulo down counter whose modulo is set by the input on line 810. Down Counter 812 is clocked by the input from line 816. Thus each time the Down Counter 812 is clocked, its output on line 814 is subtracted or counted down by one. For example, assume that the input on line 810 is three and the output on line 814 is three. After one clock pulse the output on line 814 would be two, after two clock pulses it would be one, after three clock pulses it would be zero, and after four clock pulses the output on line 814 would be reset to three and the cycle would start over.

The rate at which the Down Counter 812 is clocked is determined by the Divider 818, which applies the clock pulses on line 816. Divider 818 has a pulse applied to it on line 822 each time the Core Memory 164 has been searched. In this embodiment, each time the target word located in memory address 4096 of the Core Memory 164 is read out a pulse is applied on line 822. Divider 818 also has an input applied on line 820 by a vector cycle rate signal, $v$, determines the number of times each scan is to be displayed i.e. the number of times the targets from one scan will be refreshed on the CRT screen before the targets from the next scan are displayed. The vector cycle rate, $v$, is set by determining what display rate is pleasing to the eye (The eye integrates picture rates above 30 Hz). In this embodiment the vector cycle rate $v$ can be set from 1 to 12. Thus when $v = 1$ Down Counter 812 cycles down from the oldest to the newest target at its fastest pace, while when $v = 12$. Down Counter 812 cycles down at its slowest pace. A vector cycle rate of three means that the Down Counter 812 holds one scan value for three CRT screen refreshes. Divider 818 divides the search frequency of line 822 by the vector rate $v$ frequency on line 820. For example, if the search frequency is 30 times per second $v$ is set to 1, and six scans are to be displayed, then the time it takes the CRT beam to move from the oldest to the newest position of a moving target is $(1/30) \times 1 \times 6 = 1/5$ seconds, or a rate of 5 Hz. This may be too fast a vector cycle rate to be pleasing to the eye since this means the target would go through its complete path on the CRT display in one-fifth of a second. This 5 Hz target cycle can be reduced by setting $v$, the vector cycle rate to 5. Then the target would go through its complete path in 1 second since the same scan number would be held in Down Counter 812 for 5 refresh rate periods and thus the targets in that scan are displayed 5 times i.e. the CRT screen is refreshed 5 times before the targets in the next scan are displayed.

Figure 9:
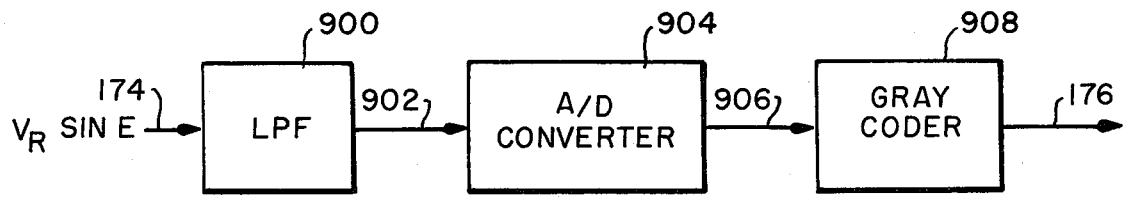
FIG. 9 is a block diagram of the Elevation A/D Converter of FIG. 3 of this invention.

FIG. 9 is a detailed block diagram of elevation A/D converter 170 of FIG. 3. In the embodiment of FIg. 3 six elevation levels are allowed.

Referring to FIG. 9 the input signal $V_R$ sin E from the antenna on line 174 is applied to Low Pass Filter 900. Low Pass Filter 900 eliminates the high frequency noise of the line. The output of Low Pass Filter 900 is applied on line 902 to the A/D Converter 904. A/D Converter 904 generates a digital signal on line 906 which is applied to Gray Coder 908. Gray Coder 908 applies a Gray Coded digital signal on line 176 which is stored in Core Memory 164, FIG. 3, along with each target X and Y coordinates and scan number.

Figure 10:
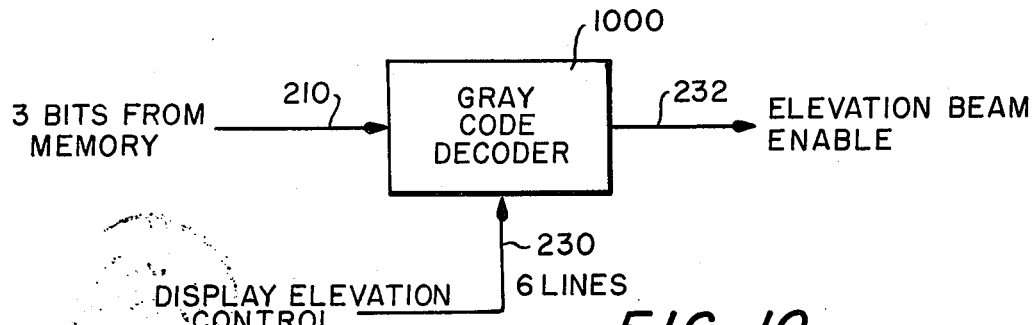
FIG. 10 is a block diagram of the Elevation Beam Processor of FIG. 3 of the present invention.

FIG. 10 is a detailed block diagram of elevation beam processor 228 of FIG. 3.

Referring to FIG. 10, Gray Code Recoder 1000 has inputs applied to it by the data from Memory 164 on line 210 and by the Display Elevation Beam Switch Signals on line 230. Gray Code Decoder 1000 decodes the memory elevation data on line 210 and then compares this decoded elevation data to Display Elevation Control signals from line 230 which determines which elevations are to be displayed on the CRT. If the decoded elevation data matches the control signals from line 230, then an elevation beam enable signal is applied on line 232 to the Hold Circuit 236 of FIG. 3.

Figure 11A:
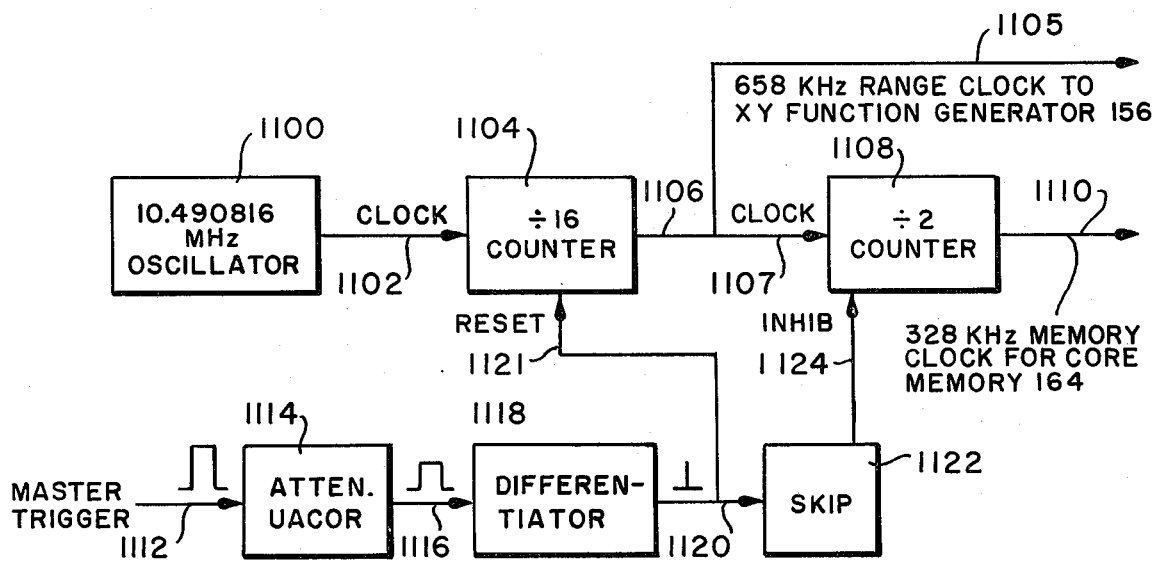
FIG. 11a is a block diagram of the Timing Generator of FIG. 3 of the present invention.
Figure 11B:
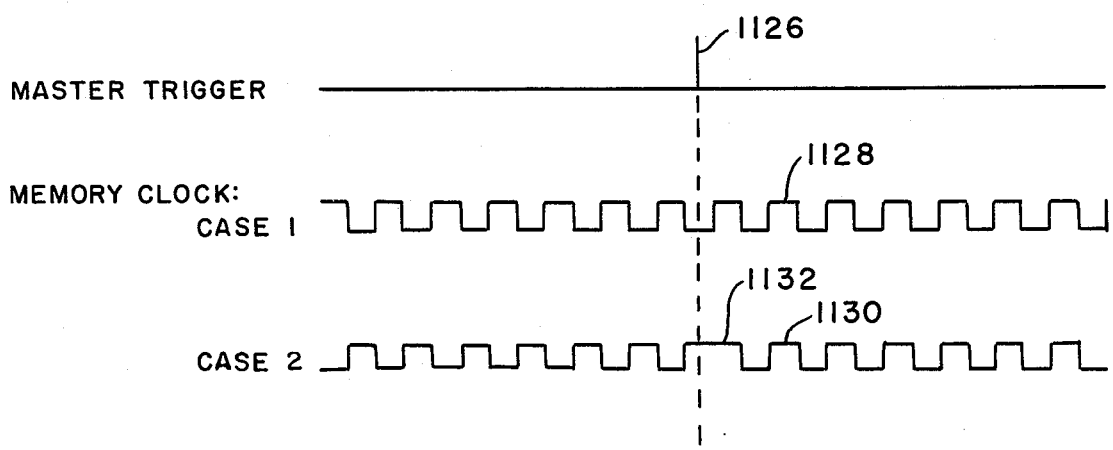
FIG. 11b is a plot of the memory clock-timing signal of FIG. 11a with respect to time of the present invention.

FIG. 11a is a detailed block diagram of Timing 286 of FIG. 3. FIG. 11b illustrates the output signal of the Timing Generator 286 of FIG. 11a.

Timing 286 provides a range clock signal to X-Y Function Generator 156 on line 1105. In order to prevent the detected target range measurement from jittering from one sweep to another of the X-Y Function Generator 156 of FIG. 3, the range clock signal of line 1105 is synchronized to the system master trigger of line 1112. Thus in operation, a 10.490816 MHz (derived from a 2000-yard mile). Oscillator 1100 provides a 10.498016 MHz signal to $\div$ 16 Counter 1104 which acts to divide this signal by 16 to get a 658 KHz signal. This 658 KHz is equivalent to a one-eighth mile pulse range interval. Thus using this range clock frequency will enable this embodiment to differentiate between targets that are one-eighth of a mile or more apart in range. Divide-by-16-Counter 1104 is reset at each master trigger from line 1112 so that the starting pulse of the range clock remains approximately the same (within 50 nanoseconds) from one sweep to the next of the X-Y Function Generator 156 of FIG. 3.

The master trigger pulse that is used to synchronize the 658 KHz range clock signal is applied to Attenuator 1114 on line 1112. The Attenuator 1114 generates an attenuated master trigger pulse on line 1116. The leading edge of this master trigger pulse is then differentiated by Differentiator 1118. This differentiated pulse is applied to the Divide-by-16-Counter 1104 to synchronize it and to Skip 1122.

Timing 286 also provides a memory clock signal of 328 KHz on line 1110 to clock Core Memory 164. This memory clock signal is obtained by dividing the 658 KHz range clock signal of line 1106 by two in Divide-by-2-Counter 1108. Since the memory clock is taken from the range clock signal, synchronization is maintained between the memory timing and its input data coming from X-Y Function Generator 156.

One potential problem created by using this type of synchronization for memory timing is that discontinuity in phase of the memory clock at master trigger time may result due to the resynchronization of the Divide-by-16-Counter 1104 by the master trigger. This could result in a shortened clock time interval, which in turn could result in a loss of memory data during a read cycle. To obviate this problem the Skip block 1122 acts to insert a time interval delay into the memory clock signal at master trigger time. To accomplish this Skip 1122 generates an inhibit signal on line 1124 upon receiving a differentiated master trigger pulse and applies this inhibit signal to Divide-by-2-Counter 1108. Thus at master trigger time one long clock time interval 1132 of FIG. 11b is inserted immediately following the master trigger time. This inserted time interval 1132 ensures that no shortened clock time interval will occur.

Figure 12:
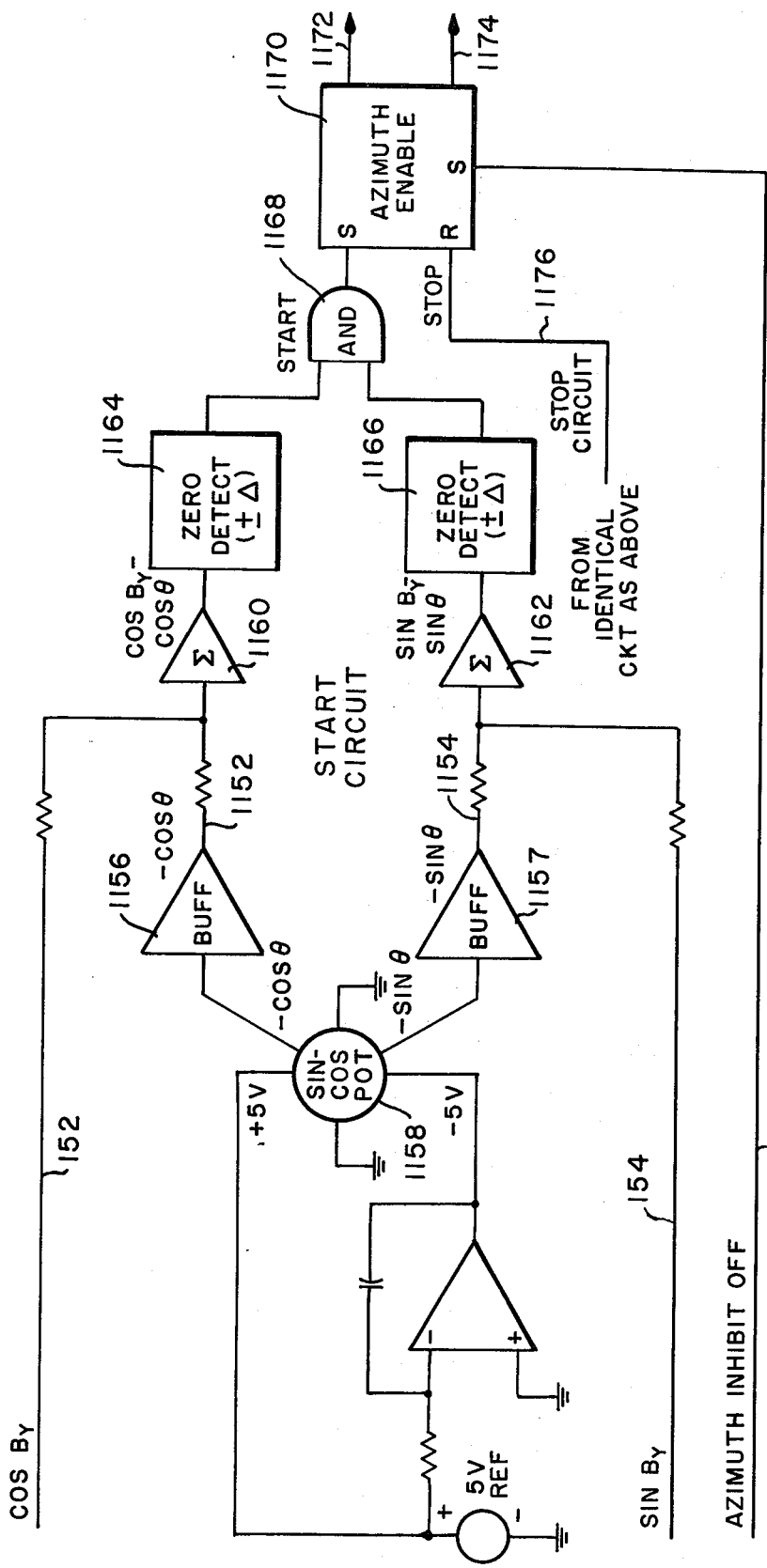
FIG. 12 is a block diagram of the Azimuth Inhibit of FIG. 3 of the present invention.

FIG. 12 is a block diagram of the Azimuth Inhibit 302 shown in FIG. 3. Unwanted clutter residue frequently will cause the core memory 164 to overload. In order to reduce the possibility of overload, only a limited portion of the scanned area can be viewed on the CRT. The Azimuth Inhibit 302 is used to restrict target data to data with X and Y coordinates within certain set bounds. Thus when the Azimuth Inhibit OFF of line 1150 is not activated, then input data outside of the selected X-Y coordinate limits is inhibited.

The operation of the Azimuth Inhibit 302 is as follows. Since the input azimuth data is in the form of sine $\theta$ and cos $\theta$, two sin-cos pots are used to generate the desired sine and cosine limits for start and stop detection. Thus the Sin-Cos Pot 1158 generates a $-\cos \theta$ which is held by buffer 1156, and a $-\sin \theta$ which is held by Buffer 1157. The azimuth Cos By information is brought in from line 152 and applied to line 1152. If the $-\cos \theta$ limited from sin $-\cos$ Pot 1158 is equal in magnitude to the Cos By information from line 152, they will cancel each other and a zero voltage signal will result. The resulting signal Cos By $-\cos \theta$ is amplified in the amplifier 1160 and applied to a Zero Detector 1164. Zero Detector 1164 generates a signal upon the detection of a zero voltage. This signal is applied as one input to an AND gate 1168. Blocks 1158, 1157, 1162, and 1166 operate in identical fashion to detect a coincidence of the Sin By antenna position data to the sin $\theta$ limit. If a zero voltage is detected by Zero Detector 1166, it applies a signal to the other input to AND gate 1168. Thus when the antenna rotates around to the X-Y start limits, both sin By and Cos By will be equal to the respective sine and cosine of the start angle. Since both inputs of the AND gate 1168 will be activated, AND gate 1168 will generate a pulse and apply it to flipflop 1170 to place it in set. A signal from flipflop 1170 will be applied to Leading Edge Detector 178 of FIg. 3 to start detection.

A circuit identical to the start limit circuit is used to determine when the antenna has rotated past its stop sin $\theta$ and cos $\theta$ limits. when the antenna has rotated past the sine $\theta$ and cos $\theta$ limits generated by a second cos-sin pot, a stop signal is applied to the reset input of flipflop 1170. When flipflop receives this input from 1176 it generates a stop pulse which is applied to Leading Edge Detector 178.

Minimum and Maximum Range Block 306 of FIg. 3 operates in an exactly identical fashion to restrict the incoming target data to within certain set range limits. Instead of a Sin-Cos Pot a minimum range time limit and a maximum range time limit are held in counting registers. The numbers held in these registers are compared in a comparator to the range time count. When the minimum range time has been equaled by the range time count, Minimum and Maximum Range 306 applies a signal pulse to Leading Edge Detector 178 allowing it to detect. Similarly, when the maximum range count has been equaled by the range time count, Minimum and Maximum Range 306 applies a signal pulse to stop Leading Edge Detector 178 from detecting.

Thus Leading Edge Detector 178 can only detect when the antenna is scanning within the limits set by Minimum and Maximum Range 306 and Azimuth Inhibit 302.

Figure 13:
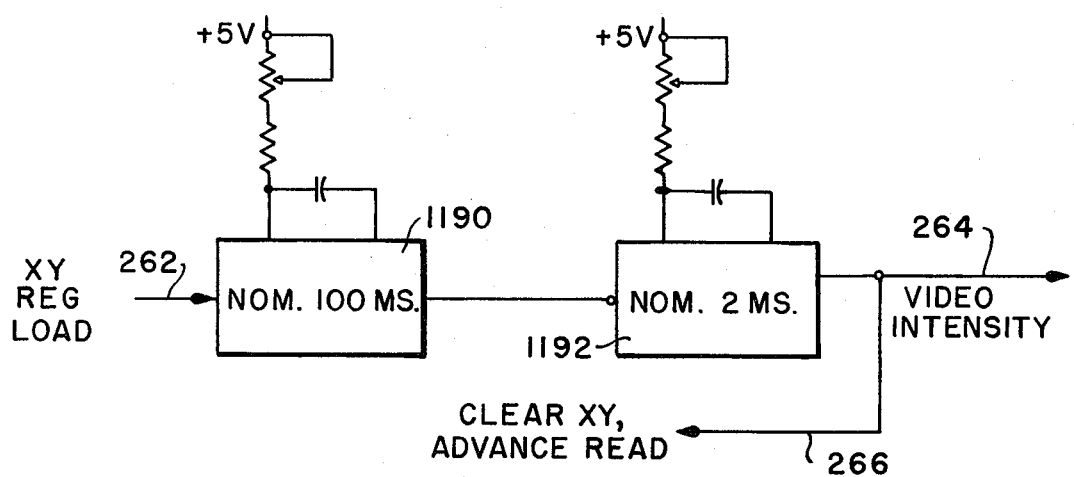
FIG. 13 is a schematic diagram of the NOM 100μ sec. HOLD of FIG. 3 of the present invention.

A certain period of time is needed to allow the CRT beam to stabilize on the desired position before the spot is intensified on the CRT to show a target position. The NOMINAL 100 Msec. hold block of FIG. 3 acts to delay the intensifier pulse a sufficient amount of time to allow the CRT beam to stabilize. This circuit, as shown in FIG. 13 is comprised of a monostable multivibrator that is triggered on line 262 each time the X-Y Register 238 of FIG. 3 receives a load pulse from Age Test Erase Display 212. Approximately 100 Msec. elapse to allow the CRT beam to stabilize on one desired position, during which time the CRT is cut-off. After the monostable times out, a 2 Msec. pulse is generated that intensifies the spot on the CRT. Then a "clear" pulse is issued on line 266 to clear the X-Y Register 238 and to signal the Memory Search Address Counter 202, via the Memory Timing 182 in order to advance to the next target in the memory to be placed on the CRT.

Figure 14:
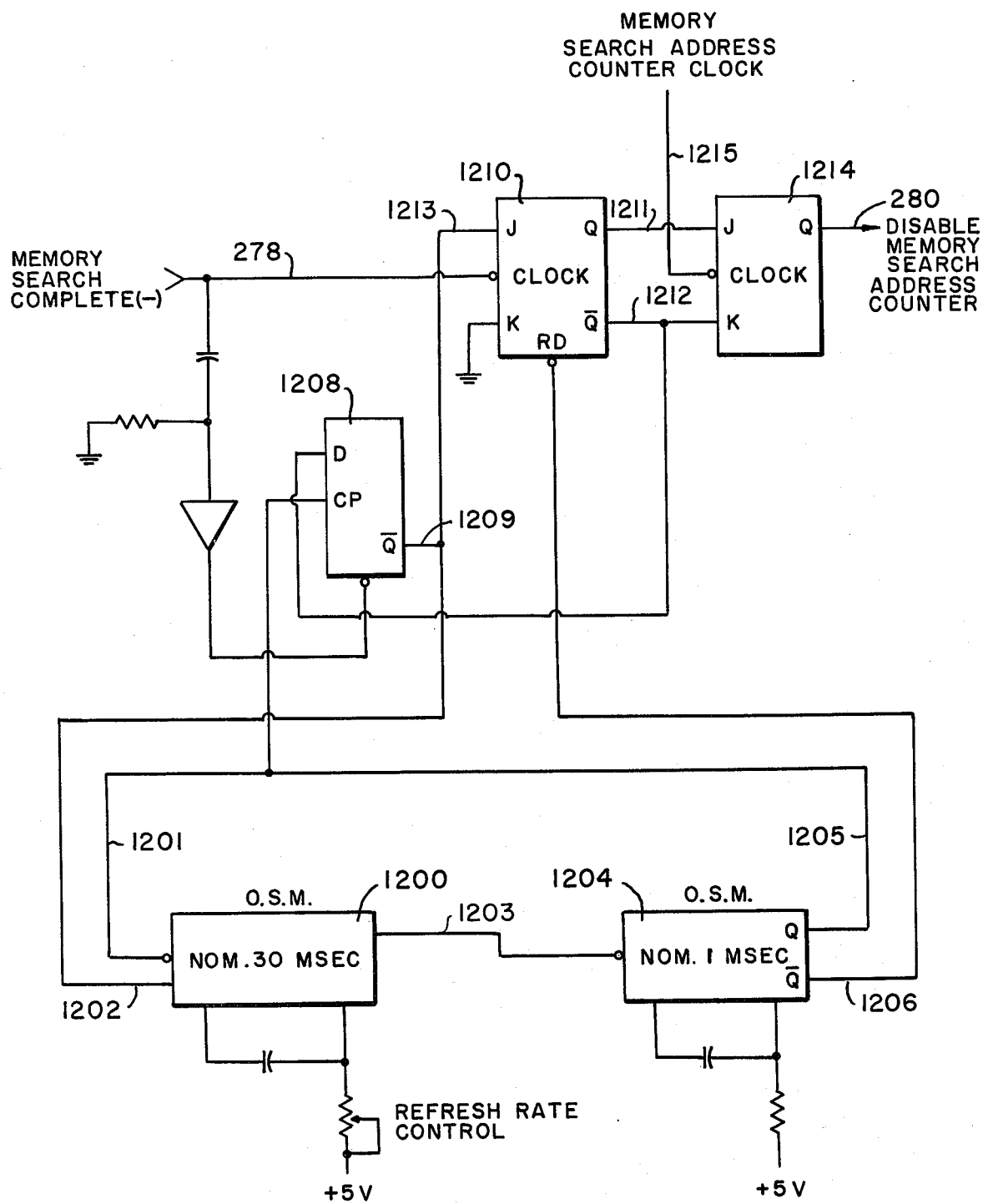
FIG. 14 is a schematic diagram of the Refresh Rate Oscillator of FIG. 3 of the present invention.

FIG. 14 is a block diagram of the Refresh Rate Oscillator 276 of FIG. 3. Oscillator 276 acts to control the refresh rate of the data in the CRT display. This refresh rate must be at a high enough frequency (30 Hz) so as to avoid visable flicker of the display. Yet the refresh rate cannot be so fast that the targets are burnt into the CRT screen. Thus the Refresh Rate Oscillator functions to slow down the refresh rate of the CRT display when the memory is being searched too fast.

The Refresh Rate Oscillator 276 of FIG. 14 operates as follows. One-shot multivibrators 1200 and 1204 continuously trigger each other on lines 1203 and 1205.

The Flipflop 1208 is normally in reset position, thereby providing a constant enable to the multivibrator 1200 on line 1202 and a flipflop 1210 set input constantly enabled on line 1213. Each time Multivibrator 1204 is triggered, it applies a pulse on line 1206 to the reset input of flipflop 1210.

To illustrate the operation of the circuit, assume that flipflop 1214 which generates the Disable signal on line 280 to Disable Memory Search Address Counter 202 has just been placed in reset. A new search of Core Memory 164 will begin. When all 4096 words in the Core Memory 164 have been searched, then a Memory Search Complete signal is applied on line 278 to the clock input of flipflop 1210. If the signal on line 278 arrives at flipflop 1210 before multivibrator 1204 has triggered and sent a pulse to the reset input of flipflop 1210, then flipflop 1210 will have its set input enabled as previously stated. Thus when the clock pulse from line 278 arrives, flipflop 1210 will set and apply an enable to the set input of flipflop 1214. Thus when the next Memory Search Address clock pulse arrives on line 1215, the flipflop 1214 will set and thus apply a Disable Memory Search Address signal on line 280 to the Memory Search Address Counter 202. When the 30 msec. multivibrator 1200 eventually triggers, it will trigger multivibrator 1204 on line 1203. Multivibrator 1204 will then apply a 1 msec. pulse to the reset input of flipflop 1210 to reset flipflop 1210 and therefore reset flipflop 1214. This resetting of flipflop 1214 stops the disable signal on line 280 and a new memory search is started.

If the memory 164 is heavily loaded and is unable to keep up with the multivibrator 1204 trigger, it then merely searches at its maximum speed without interference from the Refresh Rate Oscillator 276. Thus if flipflop 1210 has been reset, indicating that one cycle of the Refresh Rate Oscillator has elapsed without receiving a Memory Search Complete signal on line 278, flipflop 1208 will sense this by the rising edge of voltage from the line 1205 output of the multivibrator 1204. Flipflop 1208 will then inhibit flipflop 1210 and restart the multivibrator 1200 via the lines 1213 and 1202 respectively. The Multivibrator 1200 is reset in order to maintain synchronism between the Memory Search Complete pulse from line 278 and the Refresh Rate Oscillator 276. There result is that there is no disable pulse on line 280 until a Memory Search Complete Pulse is received on line 278 and subsequently multivibrator 1200 times out. Thus the Refresh Rate Oscillator 276 is slowed down to the rate of the Memory Search Complete pulse.

Figure 15:
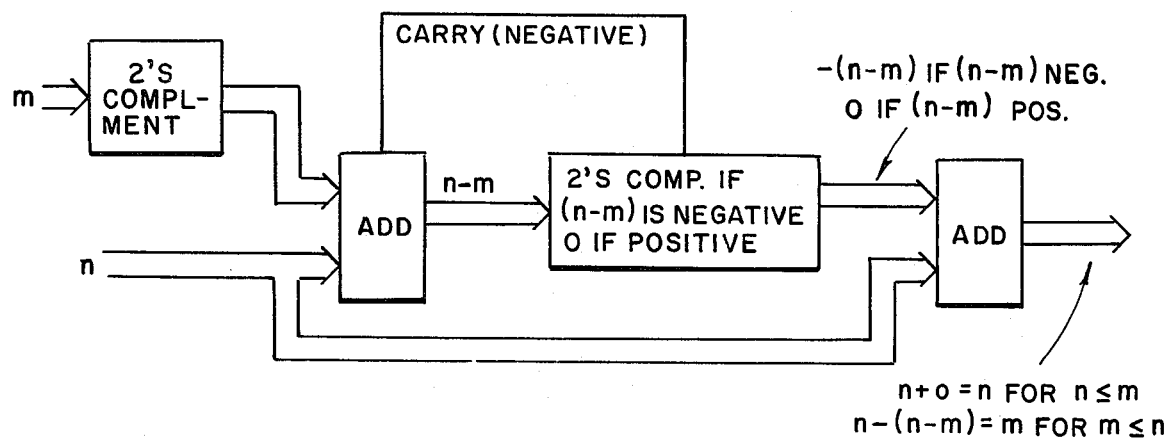
FIG. 15 is a flow chart functionally describing the operation of Least OF of FIG. 8 of the present invention.
Figure 16:
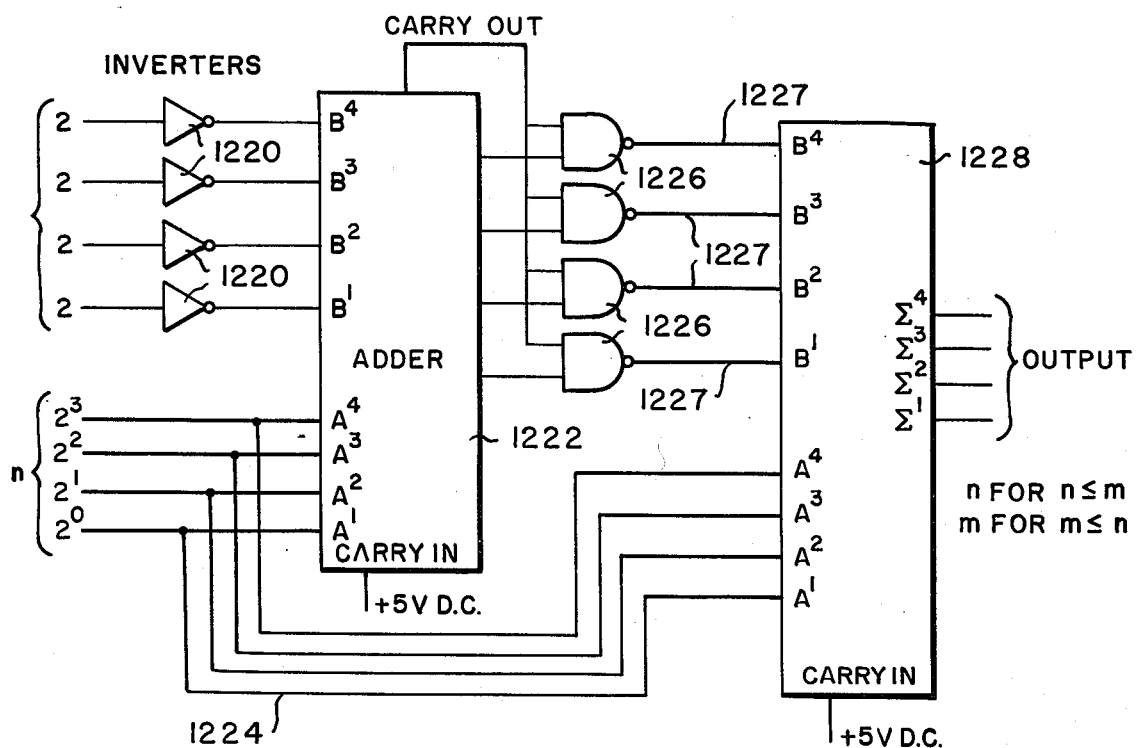
FIG. 16 is a schematic diagram of the Least OF block of the FIG. 8 of the present invention.

The Least of Circuit 808 of FIG. 8, which illustrates the Age Test Erase Display Control 212, is shown in block diagram form in FIG. 16 and in flow chart form in FIG. 15. As was stated in the description of FIG. 8, it was desired to provide the number of displays $m$ to the Down Counter 812 if $m \leq n$, the number of scans stored in the memory. If $n \leq m$ then it was desired to provide the number $n$ to the Down Counter 812. Looking at the flow chart of FIG. 15, this function is accomplished by first taking the 2's complement of the number $m$ (inverters 1220 of FIG. 16). Then the two numbers $n$ and $\overline{m}$ are added (4-bit adder 1222 of FIG. 16). The number $n$ is also applied to another adder (lines 1224 to adder 1228 of FIG. 16). The sum from this first addition n—m (adder 1222) is applied to a block which take the 's complement if the sum n —m is negative while merely generating a zero if the sum n—m is positive (positive NAND gates 1226 of FIG. 16). This output [—(n—n) if (n—m) is negative, and 0 if (n—m) is positive] is applied to the 2nd adder as one input (lines 1227 of FIG. 16). The number n is applied to this second adder (adder 1228 of FIg. 16) as the second input (lines 1224 of FIG. 16). The output of this second adder (adder 1228 of FIg. 16) is thus:

For $n \leq m$  $n + 0 = n$
For $m \leq n$  $n - (n-m) = m$.

The Skip block 1122 and the Differentiator block 1118 of FIg. 11a will now be further discussed.

Figure 17:
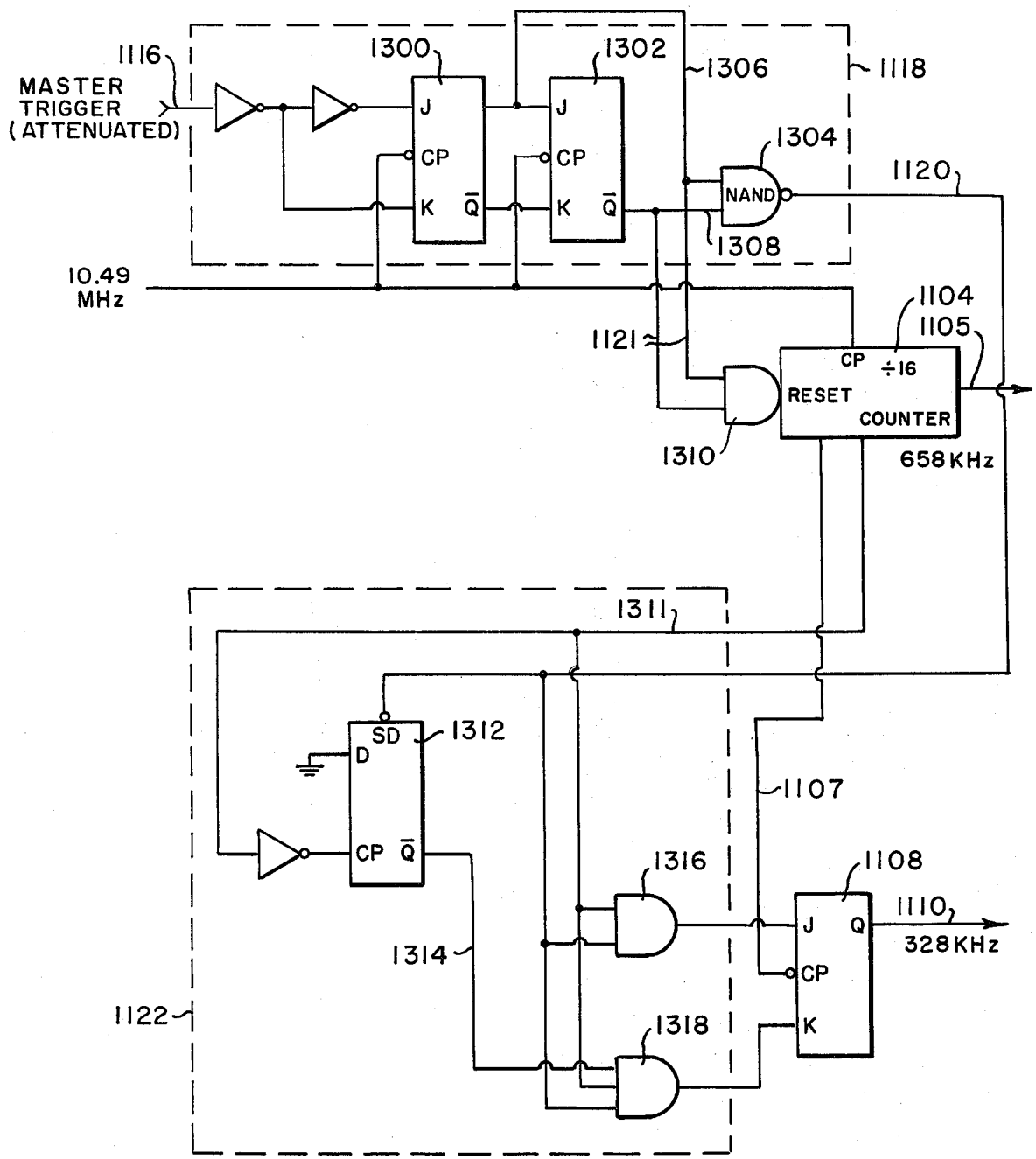
FIG. 17 is a schematic diagram of the Differentiator, the counters and the skip block of FIG. 11a of the present invention.

FIG. 17 is detailed schematic of the Differentiator 1118, the Skip block 1122, and the two counters 1104 and 1108 shown in the Timing Generator of FIG. 11a.

Initially when no master trigger pulse is present on line 1116 from the Attenuator 1114 (FIG. 11a) then the J input of flipflop 1300 is 0 and the K input is a 1. Thus the outputs of flipflop 1300 are $Q = 0$ and $\overline{Q} = 1$. The output of flipflop 1302 is $\overline{Q} = 1$ since its K input is 1. Thus the NAND gate 1304 output is 1 since the input on line 1306 from flipflop 1300 is 0 while the input from flipflop 1302 on line 1308 is 1.

When a master trigger pulse occurs, it is desired that a positive-going spike be generated at the leading-edge of the trigger pulse. Thus at master trigger pulse the J input of flipflop 1300 is 1 while the K input is 0. At the occurrence of the next 10.49 MHz clock pulse from oscillator 1100 (shown in FIG. 11a) the flipflop 1300 will set, thus making its outputs $Q = 1$ and $\overline{Q} = 0$. The output on line 1306 to the NAND gate 1304 will now be a 1. Since the flipflop 1302 must wait for the next 10.49 MHz clock pulse before it can set, its $\overline{Q}$ output on line 1308 is still a 1. Thus the NAND gate output will remain 0 until the occurrence of the next 10.49 MHz clock pulse (approximately 1 nanosecond) which acts to set flipflop 1302.

The four-stage counter 1104 acts to provide the 658 KHz to the X-Y Function Generator 156 (FIG. 11a). This counter is reset to 0 at master trigger time by an AND gate 1310. This AND gate acts to reset the Counter 1104 when both of the input lines to the NAND gate 1304 are 1.

The Skip circuit 1122 operates as follows. Flipflop 1312 is normally in reset, $\overline{Q} = 1$. When there is no master trigger pulse, the NAND gate output on line 1120 is a 1. Thus each time there is a 658 KHz clock pulse on line 1311 from the Counter 1104, both inputs (lines 1311 and 1120) are enabled of AND gate 1316 and its output is a 1, and both inputs (line 1120 and line 1314 from flipflop 1312 which is normally enabled) of AND gate 1318 are enabled and its output is also a 1. Thus the JK Flipflop 1108 is set. Upon the occurrence of the next 658 KHz clock pulse from Counter 1104 Flipflop 1108 goes to reset. Since a clock signal is only applied from Flipflop 1108 when it is in set, the 658 KHz clock pulse from Counter 1104 is halved to 328 KHz. When a master trigger signal occurs and the NAND gate 1304 output on line 1120 is a 0, then Flipflop 1312 has its set input enabled. Upon the occurrence of the next clock pulse from line 1311 the Flipflop is set and $\overline{Q}$ output is 0. The line 1314 input to AND gate 1318 is no longer enabled and thus the K input of the Flipflop 1108 is not enabled when the next 658 KHz clock pulse occurs.

Thus Flipflop 1108 cannot reset (unless it is already reset). At this next 658 KHz clock pulse on line 1311, the Flipflop 1312 is reset via its clock and D inputs. Since the line 1314 input to AND gate 1318 is now enabled, Flipflop 1108 is permitted to toggle.

Thus if the Flipflop 1108 was in set (the memory is going through its cycle at this time) and a master trigger occurs, the memory clock will not be reset, but the set pulse will be lengthened by $1/628 \times 10^6$ seconds so as to permit the memory cycle to terminate. Thus no memory information is lost.

It was determined that this method of introducing new targets and dropping old targets from the display based on integral scan numbers at times led to large sudden variations in the number of targets displayed. This characteristic had a marked tendency to cause operator fatigue. In order to produce a more readable display in which the operator is able to distinguish the start and end of each vector's cycle, the resolution of the system is increased by a factor of 8.

Thus the scan counter 58, the age test erasure display 212, and any other blocks that hold the scan number are merely modified to hold 7 bits. Now, instead of comparing the full scan numbers during the age testing of the data, scan number increments (scan number 18) are compared. Thus only one-eighth of a scan is deleted at a time. For example, if the azimuth position of the radar is beginning a new scan (0°), then all of the targets in the 0°–45° portion of the oldest scan are erased. When the azimuth reaches 45°, all the targets in the 45°–90° region of the oldest scan are erased, etc. This method results in a more pleasing presentation and less operator fatigue.

Obviously, many modifications and variations of the present invention are possible in light of the above teachings. It is therefore to be understood that, within the scope of the appended claims, the invention may be practiced otherwise than as specifically described.

What is claimed is:

1. A multiple-scan radar display functioning to display a past history of the target's position along with the target's present position in such a manner as to highlight the presence of moving targets amid stationary targets and noise by repetitively displaying data from a finite number of past radar antenna scans in rapid succession comprising:
    means to receive antenna beam-position data and convert said data to its proper form wherein said antenna beam position data consists of X-coordinate, Y-coordinate, and elevation data;
    a scan counter receiving its input signal from said means to receive antenna position data each time the antenna starts a new scan, the input signal changing the count held in said scan counter;
    gate and timing means to receive an input signal each time a target signal is detected, said gate and timing means also being connected to said means to receive antenna beam position data and to said scan counter, said gate-and-timing means sampling the X-coordinate, Y-coordinate, and elevation data therefrom and sampling the scan count in said scan counter upon the receiption of a target return signal;
    a memory, connected to said gate and timing means, into which is read the sampled data and the scan count at the proper time by the gate and timing means;

erasure test means receiving inputs from said memory and said scan counter and acting to compare the scan count of the oldest target data stored in said memory to the present scan count in said scan counter to determine whether this target data is from a scan older than the scans that are to be displayed, said erasure test means sending an erase signal to said memory if the scan count from the target data is determined to be too old;

display test means connected to said erasure test means connected to said erasure test means to receive the target data from said erasure test means if it is not too old and to compare the scan count of this target data to a scan number indicating the scan to be displayed at a particular time;

D/A converter means connected to said display test means and acting to receive a signal from said display test means if the scan number and the scan count of the target data are equal and to convert the X-coordinate, Y-coordinate, and elevation data into analog form; and a display device connected to said D/A converter means and utilizing this analog target data to display the targets in their proper sequence and position.

2. A multiple scan radar display as in claim 1 wherein said means to receive the radar antenna beam position comprises an X-Y function generator which acts to provide a constantly up-to-date X and Y coordinate without a multiplication or the requirement of a buffer by successively adding the sine and the cosine of the antenna beam position angle to themselves to provide a linearly increasing X and Y coordinate.

3. A multiple scan radar display as in claim 1, wherein said gate and timing means comprises a leading-edge detector which acts to detect a target return pulse and apply it to the timing circuitry of said gate and timing means.

4. A multiple scan radar display as in claim 1 further comprising an overload detector connected to said memory and acting to detect when there is a time or space overload in said memory.

5. A multiple scan radar display as in claim 1 further comprising an elevation beam processor acting to receive the elevation data from said memory for each target and acting to apply an enable signal to an intensifier means contained within said display means which intensifies the display at the X-Y position of the target if the elevation data of the target equals an elevation to be displayed.

6. A multiple scan radar display as in claim 1 wherein said memory comprises:

a new-target write counter which is connected to said gate and timing means and is advanced by one count whenever a target return is received by said gate and timing means;

a memory address register;

switch means which receives the count held in said new target write counter as an input and applies this count to said memory address register as the memory address for the new target return data; and a memory search address counter which generates the address of the target in the memory of the target next to be age-tested in said erasure test means, said memory search address counter being advanced by a signal from said gate and timing means when no new target data is being written in said memory, this search address count then being applied to said switch means which acts to apply this search address count to said memory address register, the address held in said memory address register being used either to write data into this address or to read data out of this address depending on whether the memory is going through a read or a write cycle.

7. A multiple scan radar display as in claim 6 wherein said memory further comprise a refresh oscillator which act to slow down the display refresh rate if the memory is being searched too fast, said refresh oscillator generating a refresh frequency signal which is compared to the frequency at which a memory search is completed, this memory search completion signal is taken as an input from said memory search address counter, if said refresh oscillator has not completed a cycle by the time the memory search is completed, then an inhibit signal is sent to said memory search address counter to inhibit it from advancing.

* * * * *